United States Patent
Choi et al.

(10) Patent No.: US 10,116,947 B2
(45) Date of Patent: Oct. 30, 2018

(54) METHOD AND APPARATUS FOR CODING MULTILAYER VIDEO TO INCLUDE SCALABLE EXTENSION TYPE INFORMATION IN A NETWORK ABSTRACTION LAYER UNIT, AND METHOD AND APPARATUS FOR DECODING MULTILAYER VIDEO

(71) Applicant: SAMSUNG ELECTRONICS CO., LTD., Suwon-si (KR)

(72) Inventors: Byeong-doo Choi, Siheung-si (KR); Jae-hyun Kim, Seoul (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 487 days.

(21) Appl. No.: 14/413,154

(22) PCT Filed: Jul. 8, 2013

(86) PCT No.: PCT/KR2013/006058
§ 371 (c)(1),
(2) Date: Jan. 6, 2015

(87) PCT Pub. No.: WO2014/007596
PCT Pub. Date: Jan. 9, 2014

(65) Prior Publication Data
US 2015/0172679 A1    Jun. 18, 2015

Related U.S. Application Data

(60) Provisional application No. 61/668,666, filed on Jul. 6, 2012.

(51) Int. Cl.
H04N 19/169    (2014.01)
H04N 19/187    (2014.01)
(Continued)

(52) U.S. Cl.
CPC ......... *H04N 19/188* (2014.11); *H04N 19/176* (2014.11); *H04N 19/187* (2014.11);
(Continued)

(58) Field of Classification Search
CPC .. H04N 19/188; H04N 19/176; H04N 19/187; H04N 19/30; H04N 19/46;
(Continued)

(56) References Cited

U.S. PATENT DOCUMENTS 8,175,168 B2    5/2012  Sun
8,428,144 B2    4/2013  Park et al.
(Continued)

FOREIGN PATENT DOCUMENTS

CN    101690220 A    3/2010
JP    2009-545206 A   12/2009
(Continued)

OTHER PUBLICATIONS

Communication dated Dec. 4, 2015, from the European Patent Office in counterpart European Application No. 13813869.8.
(Continued)

*Primary Examiner* — Gims S Philippe
*Assistant Examiner* — Stefan Gadomski
(74) *Attorney, Agent, or Firm* — Sughrue Mion, PLLC

(57) ABSTRACT

A multilayer video encoding method includes encoding a multilayer video, generating network adaptive layer (NAL) units for data units included in the encoded multilayer video, and adding scalable extension type information, for a scalable extension of the multilayer video, to a video parameter set (VPS) NAL unit among the NAL units, the VPS NAL unit including VPS information that is information commonly applied to the multilayer video.

13 Claims, 19 Drawing Sheets

| SET | Sub-layer ID 0 | Sub-layer ID 1 | Sub-layer ID 2 |
|---|---|---|---|
| 0 | Dependency ID | Quality ID | Temporal ID |
| 1 | View ID | Dependency ID | Quality ID |
| 2 | Depth flag | View ID | |
| 3 | View ID | | |

US 10,116,947 B2
Page 2

(51) Int. Cl.
| | |
|---|---|
| *H04N 19/46* | (2014.01) |
| *H04N 19/176* | (2014.01) |
| *H04N 21/2343* | (2011.01) |
| *H04N 21/236* | (2011.01) |
| *H04N 19/597* | (2014.01) |
| *H04N 19/70* | (2014.01) |
| *H04N 19/30* | (2014.01) |

(52) U.S. Cl.
CPC ............ *H04N 19/30* (2014.11); *H04N 19/46* (2014.11); *H04N 19/597* (2014.11); *H04N 19/70* (2014.11); *H04N 21/236* (2013.01); *H04N 21/234327* (2013.01)

(58) Field of Classification Search
CPC ................. H04N 19/597; H04N 19/70; H04N 21/234327; H04N 21/236
USPC ..................................................... 375/240.24
See application file for complete search history.

(56) References Cited

U.S. PATENT DOCUMENTS

| | | | |
|---|---|---|---|
| 8,488,677 B2 | 7/2013 | Jeon et al. | |
| 2006/0126962 A1 | 6/2006 | Sun | |
| 2009/0147860 A1 | 6/2009 | Pandit et al. | |
| 2010/0091840 A1* | 4/2010 | Gao ..................... | H04N 19/105 375/240.2 |
| 2010/0111193 A1* | 5/2010 | Pandit .................. | H04N 19/597 375/240.25 |
| 2010/0142613 A1* | 6/2010 | Zhu ..................... | H04N 21/2383 375/240.02 |
| 2010/0266042 A1 | 10/2010 | Koo et al. | |
| 2011/0064146 A1 | 3/2011 | Chen et al. | |
| 2011/0255796 A1* | 10/2011 | Nakamura ........... | H04N 19/597 382/232 |
| 2012/0183077 A1* | 7/2012 | Hong ..................... | H04N 19/70 375/240.25 |
| 2012/0269276 A1* | 10/2012 | Hong ..................... | H04N 19/70 375/240.25 |
| 2013/0182755 A1* | 7/2013 | Chen ..................... | H04N 19/70 375/240.01 |
| 2014/0003493 A1* | 1/2014 | Chen .................... | H04N 19/597 375/240.02 |
| 2014/0192894 A1* | 7/2014 | Deshpande ........... | H04N 19/70 375/240.25 |

FOREIGN PATENT DOCUMENTS

| | | |
|---|---|---|
| JP | 2010-16910 A | 1/2010 |
| JP | 2010-520697 A | 6/2010 |
| KR | 10-0908062 B1 | 7/2009 |
| KR | 10-2010-0014553 A | 2/2010 |
| WO | 2008/085013 A1 | 7/2008 |
| WO | 2012/096981 A1 | 7/2012 |
| WO | 2013/106705 A2 | 7/2013 |
| WO | 2013/153227 A2 | 10/2013 |

OTHER PUBLICATIONS

Byeongdoo Choi et al.,"NAL unit header for scalable extension", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Document: JCTVC-I0132, (6 Pages Total) XP030111895.

Jill Boyce et al., "Information for scalable extension high layer syntax", Joint Collaborative Team on Video Coding (JCT-VC) of ITU-T SG 16 WP 3 and ISO/IEC JTC1/SC 29/WG11, 8th Meeting: San Jose, CA, USA, Feb. 1-10, 2012, Document: JCTVC-H0386, (9 Pages Total) XP030111413.

Communication dated Feb. 9, 2016, from the Japanese Patent Office in counterpart application No. 2015-520072.

R. Skupin et al., "Generic HEVC high level syntax for scalability and adaptation", Joint Collaborative Team on Video Coding (JCT-VC) of ITU-T SG 16 WP 3 and ISO/IEC JTC 1/SC 29/WG 11, Apr. 27-May 7, 2012, Document: JCTVC-I0217, (7 Pages Total).

Miska M. Hannuksela et al., "Hook for scalable extensions: video parameter set", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Document: JCTVC-I0524, (7 Pages Total).

Jill Boyce et al., "High level syntax hooks for future extensions", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, Document: JCTVC-H0388 (7 Pages Total).

Jill Boyce et al.,"SEI message for sub-bitstream profile & level indicators", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Document: JCTVC-I0231 (8 Pages Total).

Byeongdoo Choi et al., "On NAL Unit Header and Video Parameter Set Design", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: JCT-J0432 (4 pages Total).

Ye-Kui Wang, "Solutions considered for NAL unit header and video parameter set for HEVC extensions", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: JCTVC-J1007, (7 Pages Total).

Communication dated Jun. 21, 2016, from the Japanese Patent Office in counterpart application No. 2015-520072.

Search Report dated Oct. 22, 2013 issued in International Application No. PCT/KR/2013/006058 (PCT/ISA/210).

Written Opinion dated Oct. 22, 2013 issued in International Application No. PCT/KR2013/006058 (PCT/ISA/237).

Jill Boyce, et al.; "High level syntax hooks for future extensions"; Joint Collaborative Team on Video Coding (JCT-VC) of ITU-T SG16 WP3 and ISO/IEC JTC1/SC29/WG11; Feb. 1-10, 2012; 9 pgs.

Communication dated May 3, 2017 by the State Intellectual Property Office of P.R. China in counterpart Chinese Patent Application No. 201380046648.6.

* cited by examiner

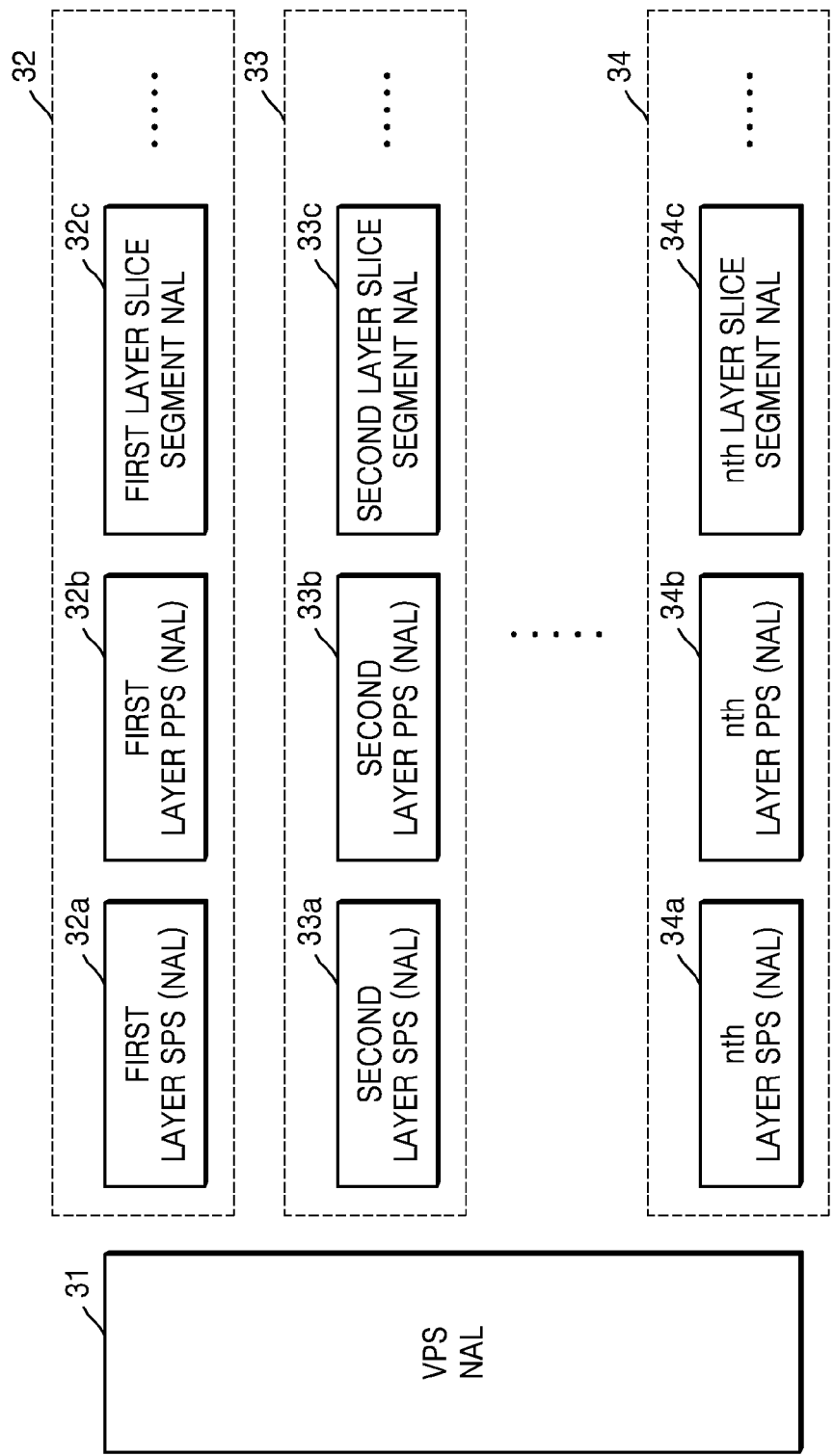

FIG. 4A
| nal_unit_header( ) { | Descriptor |
|---|---|
| forbidden_zero_bit | f(1) |
| nal_unit_type | u(6) |
| reserved_zero_6bits | u(6) |
| temporal_id | u(3) |
| } | |
FIG. 4B
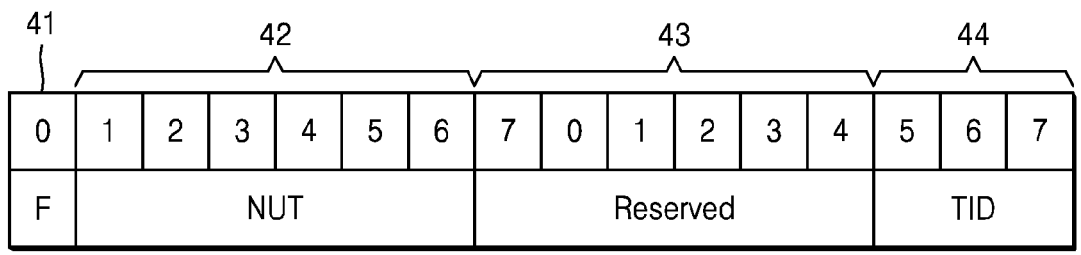
FIG. 5
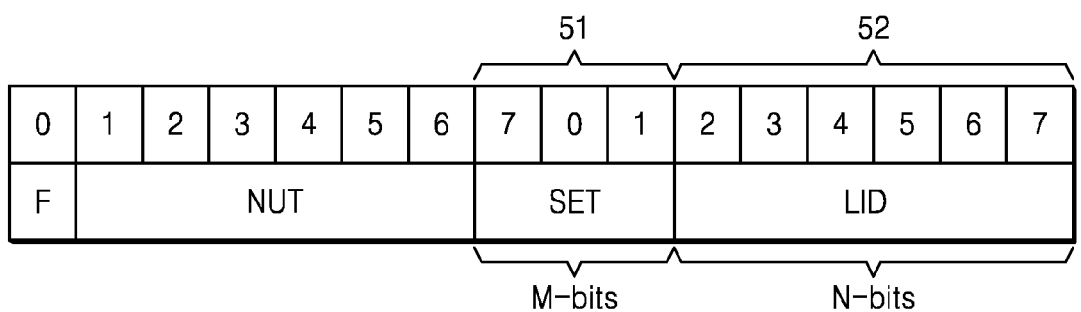

FIG. 6

| Layer ID(SET=k) | Dependent flag | Reference layer ID | Dependency ID | Quality ID | View ID | Temporal ID |
|---|---|---|---|---|---|---|
| 0 | 0 | – | 0 | 0 | 0 | 0 |
| 1 | 1 | 0 | 1 | 0 | 0 | 0 |
| 2 | 1 | 1 | 2 | 0 | 0 | 0 |
| 3 | 1 | 0 | 3 | 0 | 0 | 0 |
| 4 | 1 | 3 | 3 | 1 | 0 | 0 |
| 5 | 0 | – | 4 | 0 | 0 | 0 |
| 6 | 0 | 0 | 1 | 0 | 1 | 0 |
| 7 | 0 | 0 | 1 | 0 | 1 | 1 |

| SET | Sub-layer ID 0 | Sub-layer ID 1 | Sub-layer ID 2 |
|---|---|---|---|
| 0 | Dependency ID | Quality ID | Temporal ID |
| 1 | View ID | Dependency ID | Quality ID |
| 2 | Depth flag | View ID | |
| 3 | View ID | | |

FIG. 19
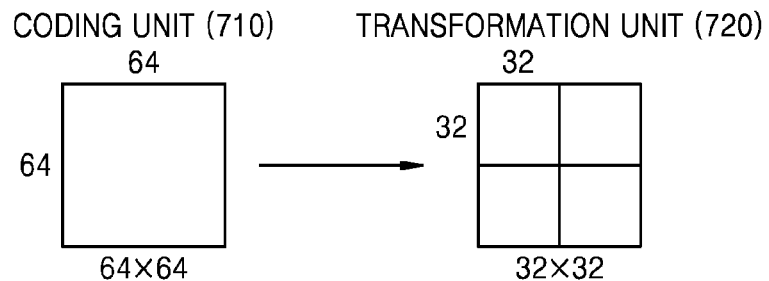
FIG. 20
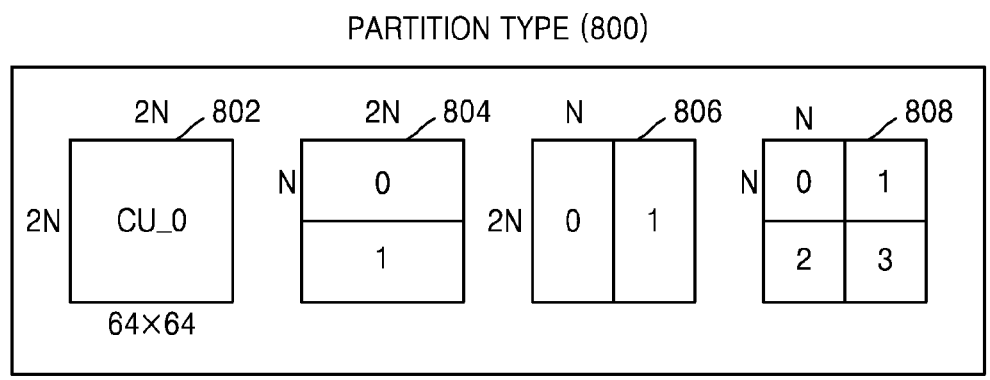
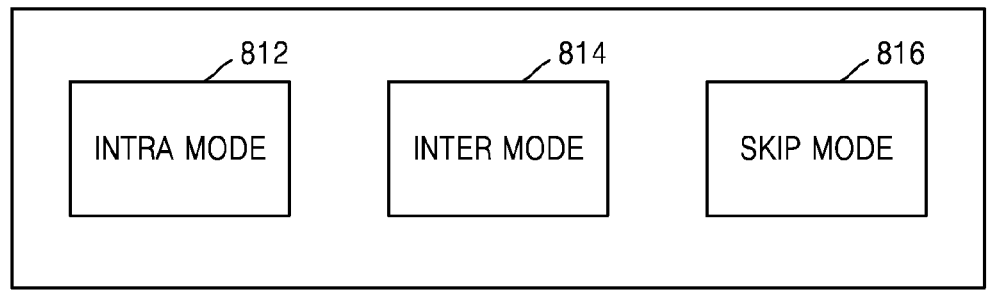
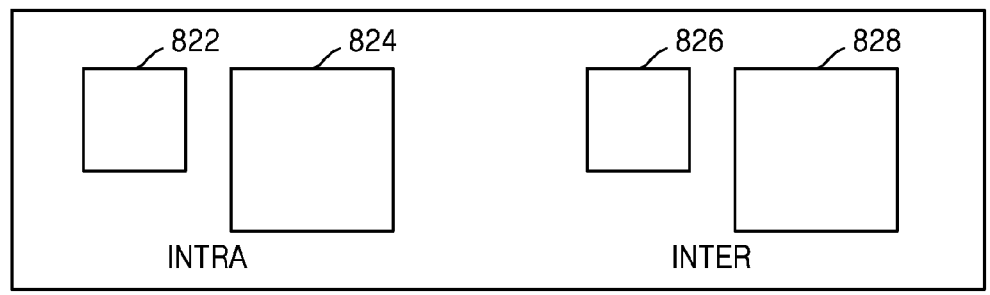

CODING UNIT (1010)

METHOD AND APPARATUS FOR CODING MULTILAYER VIDEO TO INCLUDE SCALABLE EXTENSION TYPE INFORMATION IN A NETWORK ABSTRACTION LAYER UNIT, AND METHOD AND APPARATUS FOR DECODING MULTILAYER VIDEO

CROSS-REFERENCE TO RELATED APPLICATIONS

This application is a National Stage application under 35 U.S.C. § 371 of International Application No. PCT/KR2013/006058, filed on Jul. 8, 2013, and claims the benefit of U.S. Provisional Application No. 61/668,666, filed on Jul. 6, 2012, in the U.S. Patent and Trademark Office, the disclosures of which are incorporated herein by reference in their entireties.

TECHNICAL FIELD

The exemplary embodiments are consistent with methods and apparatuses for encoding and decoding of a video consisting of multiple layers such as a scalable video and a multiview video, and more particularly, to a high level syntax structure for signaling of a multilayer video.

BACKGROUND OF THE RELATED ART

In general, image data is encoded by using a codec according to predetermined data compression standards such as Moving Picture Expert Group (MPEG) standards, and then stored in an image storage medium as a bitstream or transmitted via a communication channel.

An example of a video compression method to appropriately adjust an amount of information and transmit the information according to various communication networks and terminals is scalable video coding (SVC). SVC provides a video encoding method whereby services may be adaptively provided to various transmission networks and various reception terminals via a single video stream.

In addition, three-dimensional multimedia devices and three-dimensional multimedia contents have recently been distributed, and a multiview video coding technique for three-dimensional video coding is being widely spread.

According to SVC or multiview video coding according to the conventional art, a video is encoded by using a limited encoding method based on a macroblock of a predetermined size.

SUMMARY

The exemplary embodiments provide a NAL unit structure for signaling scalable extension type information of a multilayer video such as a multiview video and a scalable video.

According to an aspect of an exemplary embodiment, there is provided a multilayer video encoding method including encoding a multilayer video, generating network abstraction layer (NAL) units for data units included in the encoded multilayer video, and adding scalable extension type information, for a scalable extension of the multilayer video, to a video parameter set (VPS) NAL unit among the NAL units, the VPS NAL unit comprising VPS information that is information commonly applied to the multilayer video.

The generating of the NAL units may include generating a slice segment NAL unit including encoded information in units of slices for slice units included in the multilayer video, generating a picture parameter set (PPS) NAL unit including information about a PPS that is commonly applied to pictures included in the multilayer video, generating a sequence parameter set (SPS) NAL unit including information about an SPS that is commonly applied to an image sequence of a predetermined layer included in the multilayer video, and generating the VPS NAL unit including information about the VPS that is commonly applied to the multilayer video which is a set of image sequences of the predetermined layer.

The adding of the scalable extension type information may include adding, to a header of the VPS NAL unit, a scalable extension type table index indicating a scalable extension type table among scalable extension type tables including combinations of scalable extension types that are applicable to the multilayer video and a layer index indicating a combination among the combinations of the scalable extension types included in the scalable extension type table indicated by the scalable extension type table index.

The adding of the scalable extension type information may include adding, to a header of the VPS NAL unit, a scalable extension type table index indicating a scalable extension type table among scalable extension type tables including combinations of scalable extension types that are applicable to the multilayer video, wherein the PPS NAL unit may further include a layer index indicating a combination among the combinations of the scalable extension types included in the scalable extension type table indicated by the scalable extension type table index in order to indicate a scalable extension type applied to the PPS NAL unit.

The adding of the scalable extension type information may include adding, to a header of the VPS NAL unit, a scalable extension type table index indicating a scalable extension type table among scalable extension type tables including combinations of scalable extension types that are applicable to the multilayer video, wherein the SPS NAL unit may further include a layer index indicating a combination among the combinations of the scalable extension types included in the scalable extension type table indicated by the scalable extension type table index in order to indicate a scalable extension type applied to the SPS NAL unit.

The scalable extension type information may include at least one of temporal scalability, qualitative scalability, spatial scalability, and view information.

The scalable extension type information may be a scalable extension type table index indicating a scalable extension type table among scalable extension type tables including combinations of scalable extension types that are applicable to the multilayer video, wherein the scalable extension type table may be included in a supplemental enhancement information (SEI) message to be transmitted.

According to another aspect of an exemplary embodiment, there is provided a multilayer video encoding apparatus including a video encoder configured to encode a multilayer video, and an outputter configured to generate network abstraction layer (NAL) units for data units included in the encoded multilayer video, and add scalable extension type information, for scalable extension of the multilayer video, to a video parameter set (VPS) NAL unit among the NAL units, the VPS NAL unit including VPS information that is information commonly applied to the multilayer video.

According to another aspect of an exemplary embodiment, there is provided a multilayer video decoding method including receiving network abstraction layer (NAL) units that are generated by dividing an encoded multilayer video according to data units, obtaining a video parameter set (VPS) NAL unit including VPS information that is information commonly applied to the multilayer video from among the received NAL units, and obtaining scalable extension type information for scalable extension of the multilayer video from the VPS NAL unit.

The NAL units may include, for slice units included in the multilayer video, a slice segment NAL unit including encoded information of a slice unit, a picture parameter set (PPS) NAL unit including information about PPS information that is commonly applied to pictures included in the multilayer video, a sequence parameter set (SPS) NAL unit including information about SPS information that is commonly applied to an image sequence of a predetermined layer included in the multilayer video, and the VPS NAL unit, and wherein the slice segment NAL unit, the PPS NAL unit, the SPS NAL unit, and the VPS NAL unit may be identified based on a NAL unit identifier included in a header of the NAL unit.

The obtaining of the scalable extension type information may include obtaining, from a header of the VPS NAL unit, a scalable extension type table index indicating a scalable extension type table among scalable extension type tables including combinations of scalable extension types that are applicable to the multilayer video and a layer index indicating a combination among the combinations of the scalable extension types included in the scalable extension type table indicated by the scalable extension type table index.

The obtaining of the scalable extension type information may further include obtaining, from a header of the VPS NAL unit, a scalable extension type table index indicating a scalable extension type table among scalable extension type tables including combinations of scalable extension types that are applicable to the multilayer video, obtaining a layer index indicating a combination among the combinations of the scalable extension types included in the scalable extension type table indicated by the scalable extension type table index from a PPS NAL unit including information about a PPS that is commonly applied to pictures included in the multilayer video, and determining a scalable extension type applied to the pictures by using the obtained layer index.

The obtaining of the scalable extension type information may further include obtaining, from a header of the VPS NAL unit, a scalable extension type table index indicating a scalable extension type table among scalable extension type tables including combinations of scalable extension types that are applicable to the multilayer video, and obtaining a layer index indicating a combination among the combinations of the scalable extension types included in the scalable extension type table indicated by the scalable extension type table index from a SPS NAL unit including information about an SPS that is commonly applied to image sequences of a predetermined layer included in the multilayer video, and determining a scalable extension type applied to the image sequence of the predetermined layer by using the obtained layer index.

The scalable extension type information may include a scalable extension type table indicating a scalable extension type table among scalable extension type tables including combinations of scalable extension types that are applicable to the multilayer video, wherein the scalable extension type table may be included in a supplemental enhancement information (SEI) message to be received.

According to another aspect of an exemplary embodiment, there is provided a multilayer video decoding apparatus including a receiver configured to receive network abstraction layer (NAL) units that are generated by dividing a multilayer video according to data units, obtain a video parameter set (VPS) NAL unit among the NAL units, the VPS NAL unit including VPS information that is information commonly applied to the multilayer video, and obtain from the VPS NAL unit scalable extension type information for scalable extension of the multilayer video, and a video decoder configured to determine a scalable extension type applied to the data units included in the multilayer video based on the determined scalable extension type information and decode the multilayer video.

According to exemplary embodiments, scalable extension type information related to a multilayer video may be signaled by using a VPS NAL unit.

BRIEF DESCRIPTION OF THE DRAWINGS

FIG. 3 illustrates NAL units including encoded data of a multilayer video according to an exemplary embodiment;

FIGS. 4A and 4B illustrate an example of a header of a NAL unit according to an exemplary embodiment;

FIG. 5 illustrates a VPS NAL unit including scalable extension type (SET) information of a multilayer video according to an exemplary embodiment;

FIG. 6 illustrates a scalable extension type table according to an exemplary embodiment;

FIG. 19 is a diagram for describing a relationship between a coding unit and transformation units, according to an exemplary embodiment;

FIG. 20 is a diagram for describing encoding information of coding units corresponding to a coded depth, according to an exemplary embodiment;

DETAILED DESCRIPTION OF EXEMPLARY EMBODIMENTS

Hereinafter, exemplary embodiments will be described in detail with reference to the attached drawings. A method of encoding a multilayer video and a method of decoding a multilayer video according to an exemplary embodiment will be described with reference to FIGS. 1 through 13. Also, a method of encoding a video and a method of decoding a video based on a coding unit having a tree structure will be described with reference to FIGS. 13 through 25.

Figure 1:
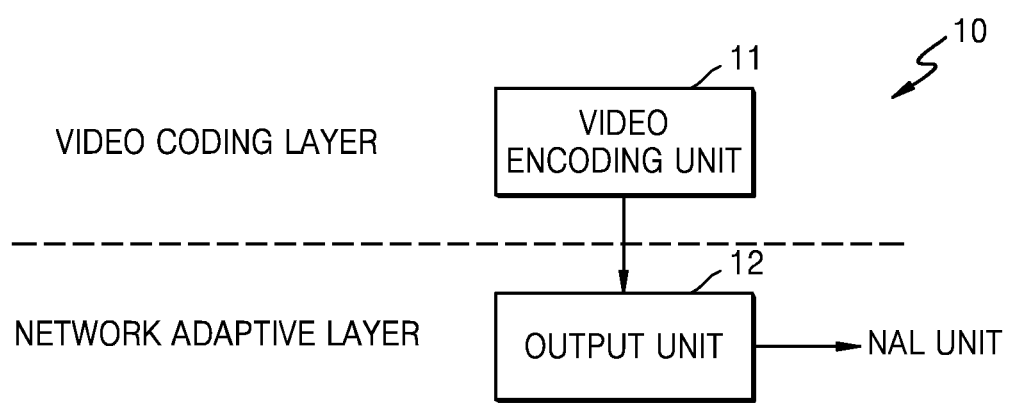
FIG. 1 is a block diagram illustrating a structure of a multilayer video encoding apparatus according to an exemplary embodiment.

FIG. 1 is a block diagram illustrating a structure of a multilayer video encoding apparatus 10 according to an exemplary embodiment.

Referring to FIG. 1, the multilayer video encoding apparatus 10 according to an exemplary embodiment includes a video encoding unit 11 (e.g., video encoder) and an output unit 12 (e.g., outputter).

The video encoding unit 11 receives a multilayer video and encodes the same. The video encoding unit 11 corresponds to a video coding layer where an encoding process of an input video is handled. As will be described later with reference to FIGS. 13 through 25, the video encoding unit 11 may encode each picture included in a multilayer video based on a coding unit having a tree structure.

The output unit 12 corresponds to a Network Adaptive (Abstraction) Layer (NAL) that adds encoded multilayer video data and additional information to a transmission data unit according to a predetermined format. The transmission data unit may be a NAL unit. The output unit 12 includes multilayer video data and additional information in a NAL unit and outputs the NAL unit.

Figure 2:
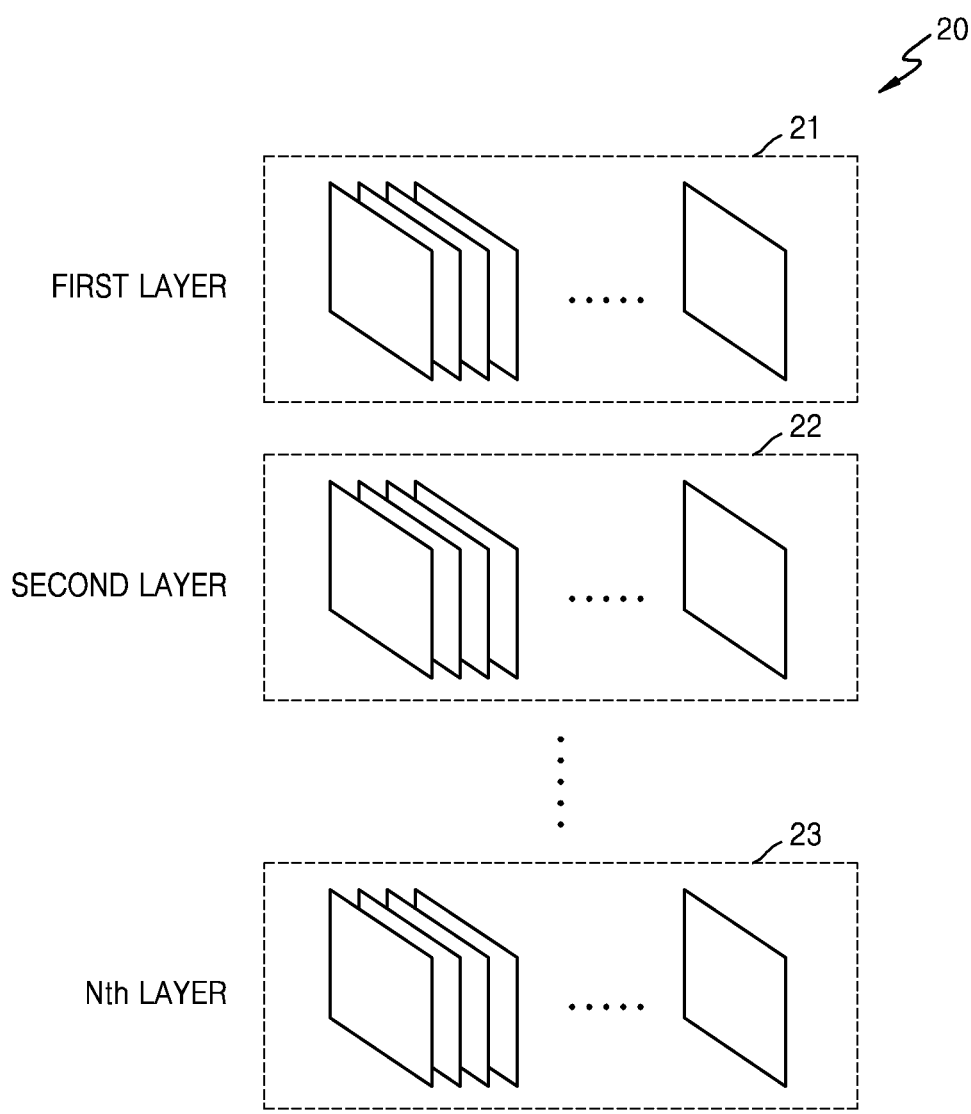
FIG. 2 illustrates a multilayer video according to an exemplary embodiment.

FIG. 2 illustrates a multilayer video according to an exemplary embodiment.

In order to enable various network environments and various terminals to provide optimum services, the multilayer video encoding apparatus 10 may encode multilayer image sequences having various spatial resolutions, various qualities, various frame-rates, and different views to output a scalable bitstream. That is, the multilayer video encoding apparatus 10 may encode an input image according to various scalable extension types (SETs) to generate a scalable video bitstream and output the same. A SET may include at least one of temporal, spatial, qualitative, and multiview scalabilities, or a combination of these scalabilities.

If a bitstream may be separated into valid substreams, a bitstream is referred to as scalable. A spatially scalable bitstream includes substreams of various resolutions. For example, a spatially scalable bitstream may be separated into substreams having different resolutions, such as QVGA, VGA, or WVGA. A temporally scalable bitstream includes substreams having various frame-rates. For example, a temporally scalable bitstream may be separated into substreams having a frame rate of 7.5 Hz, a frame rate of 15 Hz, a frame rate of 30 Hz, and a frame rate of 60 Hz. A qualitatively scalable bitstream may be separated into substreams having different qualities according to a Coarse-Grained Scalability (CGS) method, a Medium-Grained Scalability (MGS) method, or a Fine-Grained Scalability (FGS) method.

A multiview scalable bitstream includes substreams of different views within one bitstream. For example, a stereoscopic image includes a left view image and a right view image. Also, a scalable bitstream may include substreams about encoded data of multiview images and a depth map.

Different scalable extension types may be combined with one another. That is, a scalable video bitstream may include substreams in which multilayer image sequences are encoded, which include images that differ in at least one of temporal, spatial, qualitative, and multiview scalabilities.

FIG. 2 illustrates image sequences 21, 22, and 23 having different scalable extension types. The image sequence 21 of a first layer, the image sequence 22 of a second layer, and the image sequence 23 of an nth layer (n is an integer) may be image sequences that differ in at least one of resolution, quality, and view. Also, one image sequence of a layer from among the image sequence 21 of the first layer, the image sequence 22 of the second layer, and the image sequence 23 of the nth layer (n is an integer) may be an image sequence of a basic layer and the other image sequences of other layers may be image sequences of an enhancement layer.

For example, the image sequence 21 of the first layer may be first view images, the image sequence 22 of the second layer may be second view images, and the image sequence 23 of the nth layer may be nth view images. Alternatively, the image sequence 21 of the first layer may be a left view image of a basic layer, and the image sequence 22 of the second layer may be a right view image of the basic layer, and the image sequence 23 of the nth layer may be a right view image of an enhancement layer. However, the image sequences 21, 22, and 23 having different scalable extension types are not limited to the above exemplary embodiments, and may be image sequences having different image attributes.

FIG. 3 illustrates NAL units including encoded data of a multilayer video according to an exemplary embodiment.

As described above, the output unit 12 outputs NAL units including encoded multilayer video data and additional information.

A video parameter set (hereinafter referred to as "VPS") includes information applied to multilayer image sequences 32, 33, and 34 included in a multilayer video. A NAL unit including information about VPS is referred to as a VPS NAL unit 31.

The VPS NAL unit 31 includes a syntax element that is commonly shared by the multilayer image sequences 32, 33, and 34, information about an operation point to prevent transmission of unnecessary information, and necessary information about an operation point needed at a session negotiation stage such as a profile, a level, or some other session negotiation stage. In particular, the VPS NAL unit 31 according to an exemplary embodiment includes information about a scalable extension type (hereinafter referred to as "SET") for scalable extension of a multilayer video. SET is information used to determine a scalable type applied to the multilayer image sequences 32, 33, and 34 included in a multilayer video.

As will be described later, SET is a scalable extension type table index indicating one of scalable extension type tables including combinations of scalable extension types that are applicable to the multilayer image sequences 32, 33, and 34 included in a multilayer video. The VPS NAL unit 31 may further include a layer index indicating one of combinations of scalable extension types included in a scalable extension type table indicated by the scalable extension type table index. Instead of being included in the VPS NAL unit 31, LID may be included in sequence parameter set information (SPS) NAL units 32a, 33a, and 34a including sequence parameter set (SPS) information or in picture parameter set information (PPS) NAL units 32b, 33b, and 34b including picture parameter set (PPS) information.

An SPS includes information that is commonly applied to an image sequence of a layer. SPS NALs 32a, 33a, and 34a including SPS respectively include information that is commonly applied to the image sequences 32, 33, and 34.

A PPS includes information that is commonly applied to pictures of a layer. PPS NALs 32b, 33b, and 34b including the PPS each include information that is commonly applied to pictures of the same layer. A PPS may include an encoding mode of the entire pictures, for example, an entropy encoding mode, information about a quantization parameter initial value of a picture unit, etc. A PPS is not necessary to be generated for every picture. That is, if a PPS is not included, a previously existing PPS may be used, a new PPS may be set if information included in the PPS has to be renewed, and a PPS NAL unit including information about the set PPS may be generated.

A slice segment includes encoding data of at least one maximum coding unit, and the slice segment may be included in slice segment NALs 32c, 33c, and 34c and transmitted.

As illustrated in FIG. 3, a video includes multilayer image sequences 32, 33, and 34. To identify a sequence, an SPS identifier (sequence_parameter_set_id) is included in an SPS of each layer, and a sequence including a PPS may be identified by designating an SPS identifier to the PPS. Also, a PPS identifier (picture_parameter_set_id) is included in a PPS, and as a PPS identifier is included in the slice segment, which PPS is used by the slice segment may be identified. Also, by using an SPS identifier included in a PPS indicated by a PPS identifier of a slice segment, SPS and layer information used in a slice segment may be identified. For example, it is assumed that an SPS identifier (sequence_parameter_set_id) of the first layer SPS NAL 32a has a value of 0. In this case, the first layer PPS NAL 32b included in the first layer image sequence 32 includes an SPS identifier (sequence_parameter_set_id) having a value of 0. Also, it is assumed that a PPS identifier (picture_parameter_set_id) of the first layer PPS NAL 32b has a value of 0. In this case, the first layer slice segment NAL 32c that refers to the first layer PPS NAL 32b has a PPS identifier (picture_parameter_set_id) having a value of 0.

Although FIG. 3 illustrates that one VPS is configured, a plurality of multilayer videos may also be repeatedly provided. In this case, in order to identify a multilayer video in which NAL units are included, from among the plurality of multilayer videos, a VPS identifier (video_parameter_set_id) may be included in an SPS NAL unit. For example, if a VPS identifier (video_parameter_set_id) of the VPS NAL 31 has a value of 0, a VPS identifier (video_parameter_set_id) having a value of 0 may be included in the SPS NALs 32a, 33a, and 34a included in one multilayer video.

FIGS. 4A and 4B illustrate an example of a header of an NAL unit according to an exemplary embodiment.

Referring to FIGS. 4A and 4B, a NAL unit header has a length of a total of two bytes. In FIG. 4B, 0 to 7 denote each bit included in two bytes. A NAL unit header includes, as bits for identifying a NAL unit, forbidden_zero_bit (F) 41 having a value of 0, an identifier 42 indicating a type of a NAL unit (nal unit type, hereinafter referred to as "NUT"), a reserved area (reserved_zero_6 bits) 43 that is reserved for future use, and a temporal identifier (temporal ID) 44. The identifier NUT 42 and the reserved area 43 may each consist of 6 bits, and the temporal ID (TID) 44 may consist of 3 bits.

In order to add scalable extension type (SET) information of a multilayer video to a NAL unit illustrated in FIGS. 4A and 4B, the output unit 12 according to an exemplary embodiment may use the reserved area 43 for future use and the temporal ID 44, from among areas of a VPS NAL unit header.

FIG. 5 illustrates a VPS NAL unit including scalable extension type (SET) information of a multilayer video according to an exemplary embodiment.

Referring to FIG. 5, a header of a NAL unit for scalable extension of a multilayer video according to an exemplary embodiment includes, besides the forbidden_zero_bit (F), which is a bit for identifying a NAL unit and has a value of 0, and a NUT, which indicates a type of a NAL unit, scalable extension type (SET) information 51 of M bits (M is an integer) and layer index information (Layer ID, hereinafter referred to as "LID") 52 of N bits (N is an integer) indicating a scalable extension type applied to images included in a current multilayer video from among combinations of a plurality of scalable extension types included in a scalable extension type table.

At least one of an Instantaneous Decoding Refresh (IDR) picture, a Clean Random Access (CRA) picture, VPS, SPS, PPS, Supplemental Enhancement Information (SEI), an Adaptation Parameter Set (APS), a reserved NAL unit reserved for future use, and undefined NAL unit which is included in a NAL unit may be identified based on a value of NUT (nal_unit_type).

Table 1 is a table showing types of NAL units according to a Nal_unit_type (NUT) according to an exemplary embodiment.

TABLE 1

| nal_unit_type | Name of nal_unit_type | Content of NAL unit and RBSP syntax structure |
|---|---|---|
| 0 | TRAIL_N | Coded slice segment of a non-TSA, non-STSA trailing picture |
| 1 | TRAIL_R | slice_segment_layer_rbsp( ) |
| 2 | TSA_N | Coded slice segment of a TSA picture |

TABLE 1-continued

| nal_unit_type | Name of nal_unit_type | Content of NAL unit and RBSP syntax structure |
|---|---|---|
| 3 | TSA_R | slice_segment_layer_rbsp( ) |
| 4 | STSA_N | Coded slice segment of an STSA picture |
| 5 | STSA_R | slice_segment_layer_rbsp( ) |
| 6 | RADL_N | Coded slice segment of a RADL picture |
| 7 | RADL_R | slice_segment_layer_rbsp( ) |
| 8 | RASL_N | Coded slice segment of a RASL picture |
| 9 | RASL_R | slice_segment_layer_rbsp( ) |
| 10 | RSV_VCL_N10 | Reserved non-IRAP sub-layer non-reference |
| 12 | RSV_VCL_N12 | VCL NAL unit types |
| 14 | RSV_VCL_N14 | |
| 11 | RSV_VCL_R11 | Reserved non-IRAP sub-layer reference VCL |
| 13 | RSV_VCL_R13 | NAL unit types |
| 15 | RSV_VCL_R15 | |
| 16 | BLA_W_LP | Coded slice segment of a BLA picture |
| 17 | BLA_W_RADL | slice_segment_layer_rbsp( ) |
| 18 | BLA_N_LP | |
| 19 | IDR_W_RADL | Coded slice segment of an IDR picture |
| 20 | IDR_N_LP | slice_segment_layer_rbsp( ) |
| 21 | CRA_NUT | Coded slice segment of a CRA picture slice_segment_layer_rbsp( ) |
| 22 | RSV_IRAP_VCL22 | Reserved IRAP VCL NAL unit types |
| 23 | RSV_IRAP_VCL23 | |
| 24 . . . 31 | RSV_VCL24 . . . RSV_VCL31 | Reserved non-IRAP VCL NAL unit types |
| 32 | VPS_NUT | Video parameter set video_parameter_set_rbsp( ) |
| 33 | SPS_NUT | Sequence parameter set seq_parameter_set_rbsp( ) |
| 34 | PPS_NUT | Picture parameter set pic_parameter_set_rbsp( ) |
| 35 | AUD_NUT | Access unit delimiter access_unit_delimiter_rbsp( ) |
| 36 | EOS_NUT | End of sequence end_of_seq_rbsp( ) |
| 37 | EOB_NUT | End of bitstream end_of_bitstream_rbsp( ) |
| 38 | FD_NUT | Filler data filler_data_rbsp( ) |
| 39 | PREFIX_SEI_NUT | Supplemental enhancement information |
| 40 | SUFFIX_SEI_NUT | sei_rbsp( ) |
| 41 . . . 47 | RSV_NVCL41 . . . RSV_NVCL47 | Reserved |

Referring to Table 1, nal_unit_type of a NAL unit including a VPS may be set to 32. Also, scalable extension type information of a multilayer video according to an exemplary embodiment may be included in NAL units that are reserved for future use, that is, NAL units with nal_unit_type of a value from 41-47. However, a type of a NAL unit is not limited thereto, and may be modified according to nal_unit_type.

The scalable extension type (SET) information 51 corresponds to a scalable extension type table index indicating one of scalable extension type tables including combinations of scalable extension types that are applicable to a multilayer video. Also, LID 52 indicates one of combinations of the scalable extension types included in a scalable extension type table indicated by the scalable extension type table index.

FIG. 6 illustrates a scalable extension type table according to an exemplary embodiment.

Referring to FIG. 6, if the SET 51 has a particular value k (k is an integer), a scalable extension type table may be defined. It is assumed that if the SET 51 is a particular value k, one scalable extension type table as illustrated in FIG. 6 is defined. The kinds of combinations of scalable extension types which are indicated may be determined based on a value of the LID 52. For example, if it is assumed that the SET 51 has a value k and the LID 52 has a value of 3, as denoted by reference numeral 61, NAL units included in a current multilayer video are data units regarding a layer having a scalable extension type where Dependent flag=1, Reference layer ID=0, Dependency ID=3, Quality ID=0, View ID=0, and Temporal ID=0.

Dependent flag denotes whether data of a current layer is an independent layer that refers to data of another layer or a dependent layer that refers to data of another layer. If Dependent flag is 0, data of the current layer is an independent layer. If Dependent flag is 0, an image of each layer included in a multilayer video is independently encoded or decoded. Reference layer ID denotes a layer ID that data of a current layer refers to. Dependency ID refers to an identifier of a layer that data of a current layer depends on. Quality ID denotes a quality of an image included in a multilayer video. View ID denotes a view of an image included in a multilayer video. Temporal ID is a temporal identifier for temporal scalability of an image included in a multilayer video.

Although a scalable extension type table in the case where the SET 51 has a particular value k is illustrated in FIG. 6, if the SET 51 consists of M bits as illustrated in FIG. 5, the SET 51 may have a maximum value of 2^M. Accordingly, a maximum of 2^M scalable extension type tables may be previously defined based on a value of the SET 51. A scalable extension type table as illustrated in FIG. 6 may be previously defined in a video encoding apparatus and a video decoding apparatus, or may be transmitted from a video encoding apparatus to a video decoding apparatus via an SPS, a PPS, or an SEI (Supplemental Enhancement Information) message. A SEI message may also be included in a NAL unit of a predetermined nal unit type to be transmitted.

Figure 7A:
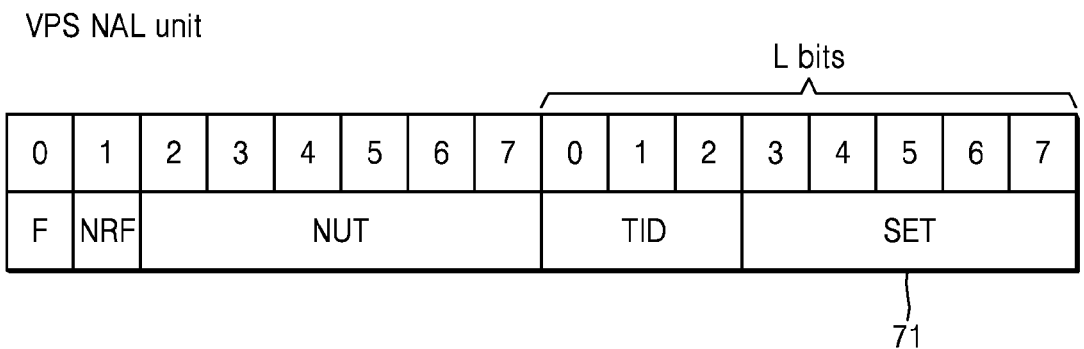
FIG. 7A illustrates a VPS NAL unit including SET information of a multilayer video according to another exemplary embodiment.
Figure 7B:
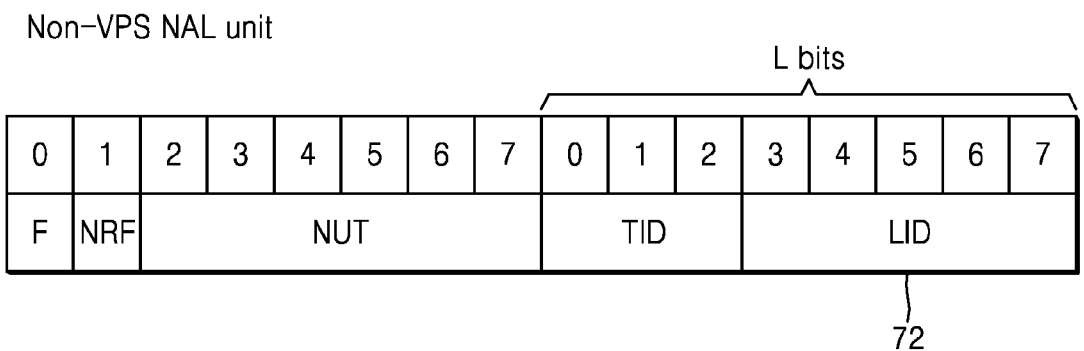
FIG. 7B illustrates NAL units other than a VPS NAL unit according to another exemplary embodiment.

FIG. 7A illustrates a VPS NAL unit including scalable extension type (SET) information of a multilayer video according to another exemplary embodiment. FIG. 7B illustrates NAL units other than a VPS NAL unit according to another exemplary embodiment.

Referring to FIGS. 7A and 7B, in a VPS NAL unit, only scalable extension type (SET) information 71 for determining a scalable extension type table is included, and in NAL units other than the VPS NAL unit, LID 72 indicating a scalable extension type applied to data included in a current NAL unit from among combinations of a plurality of scalable extension types included in the scalable extension type table may be included.

As in the above-described exemplary embodiment, scalable extension type (SET) information 51 included in a VPS NAL unit corresponds to a scalable extension type table index indicating one of scalable extension type tables including combinations of scalable extension types that are applicable to a multilayer video.

Instead of being included in the VPS NAL unit 31, LID may be included in an SPS NAL unit including SPS information of each layer or in PPS NAL units including PPS information of each layer. If LID is included in an SPS NAL unit, different scalable extension types may be applied to respective sequences. If LID is included in a PPS NAL unit, different scalable extension types may be applied to respective pictures.

Figure 8:
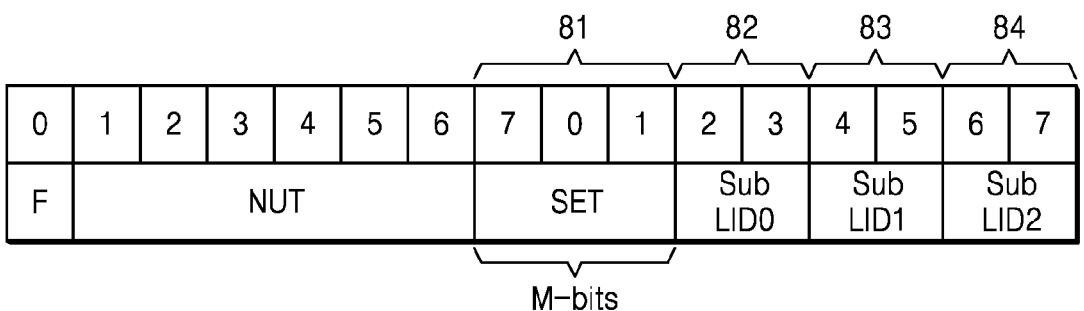
FIG. 8 illustrates a header of a NAL unit for scalable extension according to another exemplary embodiment.

FIG. 8 illustrates a header of a NAL unit for scalable extension according to another exemplary embodiment.

Similar to the NAL unit header of FIG. 5 described above, a NAL unit according to another exemplary embodiment redefines a reserved area reserved for future use and an area of a temporal identifier (temporal ID) to include scalable extension type information. The NAL unit according to another exemplary embodiment may include, besides VPS, scalable extension type information that is set in units of sequences, pictures, and slices, and indicates whether a scalable type applied for each data unit is applied.

Referring to FIG. 8, a NAL unit header according to another exemplary embodiment includes a SET 81 consisting of M bits, a first sub-layer index (Sub-LID1) 82, a second sub-layer index (Sub-LID1) 83, and a third sub-layer index (Sub_LID2) 84. The SET 81 is scalable index information for determining which scalable extension type is indicated by the first sub-layer index (Sub-LID0) 82, the second sub-layer index (Sub-LID1) 83, and the third sub-layer index (Sub_LID2) 84. That is, the SET 81 may be information for determining which of a plurality of scalable extension type information each of the first sub-layer index (Sub-LID0) 82, the second sub-layer index (Sub-LID1) 83, and the third sub-layer index (Sub_LID2) 84 corresponds to.

Figures 9, 10:
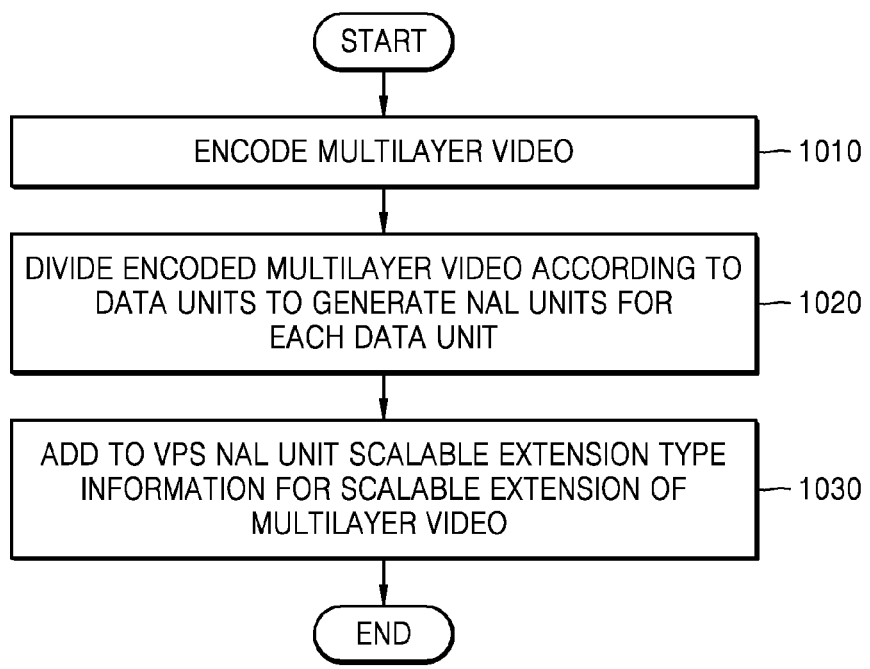
FIG. 9 illustrates an example of scalable extension type information indicated by a first sub-layer index (SubLID0) 82, a second sub-layer index (SubLID1) 83, and a third sub-layer index (Sub_LID2) 84 according to a SET 81 of the header of the NAL unit of FIG. 8.
FIG. 10 is a flowchart illustrating a method of encoding a multilayer video according to an exemplary embodiment.

FIG. 9 illustrates an example of scalable extension type information indicated by the first sub-layer index SubLID0 82, the second sub-layer index SubLID1 83, and the third sub-layer index Sub_LID2 84 according to the SET 81 of the NAL unit of FIG. 8.

Referring to FIG. 9, the scalable extension type information which is indicated by the first sub-layer index (Sub-LID0) 82, the second sub-layer index (Sub-LID1) 83, and the third sub-layer index (Sub_LID2) 84 may be indicated based on a value of the SET 81. For example, if the SET 81 has a value of 1, a value of the first sub-layer index (Sub-LID0) 82 indicates view information (view ID), the second sub-layer index (Sub-LID1) 83 indicates a dependency ID, and the third sub-layer index (Sub_LID2) 84 indicates a qualitative scalability (quality_id).

Although three sub-layer indices are included in FIG. 9, the number of sub-layer indices is not limited thereto, and a sub-layer index may be extended to indicate three or more pieces of scalable extension type information within a range of available bit numbers. Also, scalable extension type information indicated by each sub-layer index may be modified according to the SET 81.

FIG. 10 is a flowchart illustrating a method of encoding a multilayer video according to an exemplary embodiment.

Referring to FIGS. 1 and 10, in operation 1010, the video encoding unit 11 encodes a multilayer video. As described above, a multilayer video refers to image sequences of multiple layers including different images that differ in at least one of temporal, spatial, qualitative, and multi-view scalabilities.

In operation 1020, the output unit 12 divides encoded multilayer video according to data units and generates network abstraction layer (NAL) units for each data unit. As described above, the output unit 12 may generate a slice segment NAL unit including encoded information in units of slices for each slice unit included in a multilayer video. Also, the output unit 12 may generate a PPS NAL unit including information about a PPS that is commonly applied to pictures included in a multilayer video. Also, the output unit 12 may generate SPS NAL units including information about an SPS that is commonly applied to an image sequence of a predetermined layer included in a multilayer video. Also, the output unit 12 may generate a VPS NAL unit including information about a VPS that is commonly applied to a multilayer video.

In operation 1030, the output unit 12 may add scalable extension type information for scalable extension of a multilayer video. As in the above-described exemplary embodiment, the output unit 12 may include, in a VPS NAL unit, SET information corresponding to a scalable extension type table index indicating one of scalable extension type tables including combinations of scalable extension types that are applicable to a multilayer video and LID indicating one of combinations of the scalable extension types included in a scalable extension type table indicated by the scalable extension type table index.

Also, the output unit 12 may include in a VPS NAL unit only SET information, and LID in an SPS VAL unit including SPS information of each layer, or LID in a PPS NAL unit including PPS information of each layer.

Figure 11:
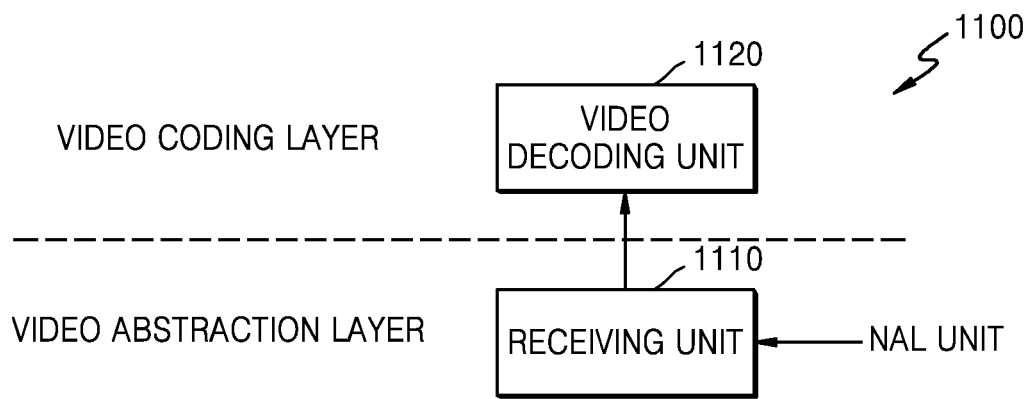
FIG. 11 is a block diagram illustrating a structure of an apparatus for decoding a multilayer video according to an exemplary embodiment.

FIG. 11 is a block diagram illustrating a structure of a multilayer video decoding apparatus according to an exemplary embodiment.

Referring to FIG. 11, the multilayer video decoding apparatus 1100 includes a receiving unit 1110 (e.g., receiver) and a video decoding unit 1120 (e.g., video decoder).

The receiving unit 1110 receives a NAL unit of a network abstraction layer, and identifies a VPS NAL unit including scalable extension type information according to exemplary embodiments. A VPS NAL unit may be determined by using nal_unit_type (NUT) which is an identifier indicating a type of a NAL unit. Scalable extension type information according to exemplary embodiments may be included in a reserved area of a VPS NAL unit.

The receiving unit 1110 according to an exemplary embodiment may parse a VPS NAL unit including scalable extension type information to obtain SET information corresponding to a scalable extension type table index indicating one of scalable extension type tables including combinations of scalable extension types that are applicable to a current multilayer video and LID indicating one of combinations of the scalable extension types included in the scalable extension type table indicated by the scalable extension type table index.

The receiving unit 1110 according to another exemplary embodiment may obtain only SET information from a VPS NAL unit and obtain LID from other NAL units than the VPS NAL unit. That is, the receiving unit 1110 may obtain LID for determining a scalable extension type applied to images included in a current sequence, from an SPS NAL unit including SPS information of each layer or may obtain LID for determining a scalable extension type applied to pictures, from a PPS NAL unit including PPS information.

The video decoding unit 1120 determines a scalable extension type applied to images included in a multilayer video based on SET information and LID information and decodes the multilayer video. The video decoding unit 1120 may decode a multilayer video based on coding units having a tree structure. A decoding process of a multilayer video based on coding units having a tree structure will be described below.

Figure 12:
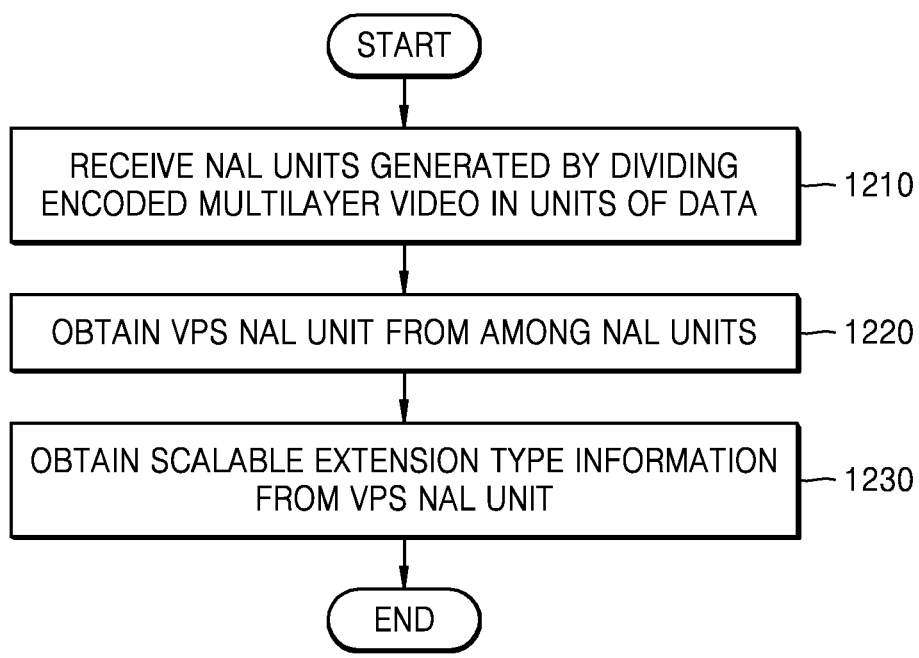
FIG. 12 is a flowchart illustrating a method of decoding a multilayer video according to an exemplary embodiment.

FIG. 12 is a flowchart illustrating a method of decoding a multilayer video according to an exemplary embodiment.

Referring to FIGS. 11 and 12, in operation 1210, the receiving unit 1110 receives NAL units that are generated by dividing an encoded multilayer video according to data units.

In operation 1220, the receiving unit 1110 obtains a VPS NAL unit including VPS information from among received NAL units. A VPS NAL unit may be determined by using nal_unit_type (NUT) which is an identifier indicating a type of a NAL unit.

In operation 1230, the receiving unit 1110 obtains scalable extension type information for scalable extension of a multilayer video, from a VPS NAL unit. The receiving unit 1110 according to an exemplary embodiment may parse a VPS NAL unit including scalable extension type information to obtain SET information corresponding to a scalable extension type table index indicating one of scalable extension type tables including combinations of scalable extension types that are applicable to a multilayer video and LID indicating one of combinations of the scalable extension types included in the scalable extension type table indicated by the scalable extension type table index. The receiving unit 1110 according to another exemplary embodiment may obtain only SET information from a VPS NAL unit and LID from other NAL units than the VPS NAL unit. That is, the receiving unit 1110 may obtain LID for determining a scalable extension type applied to images included in a current sequence, from an SPS NAL unit including SPS information of each layer or may obtain LID for determining a scalable extension type applied to pictures, from a PPS NAL unit including PPS information.

The video decoding unit 1120 determines a scalable extension type applied to images included in a multilayer video based on SET information and LID information, and decodes the multilayer video.

A video encoding method and a video decoding method based on coding units having a tree structure will be described with reference to FIGS. 13 through 25. The video encoding method and the video decoding method based on coding units having a tree structure described below are related to encoding or decoding of pictures included in a multilayer video performed in the video encoding unit 11 of the video encoding apparatus 10 of FIG. 1 and the video decoding unit 1120 of the video decoding apparatus 1100 of FIG. 11.

Figure 13:
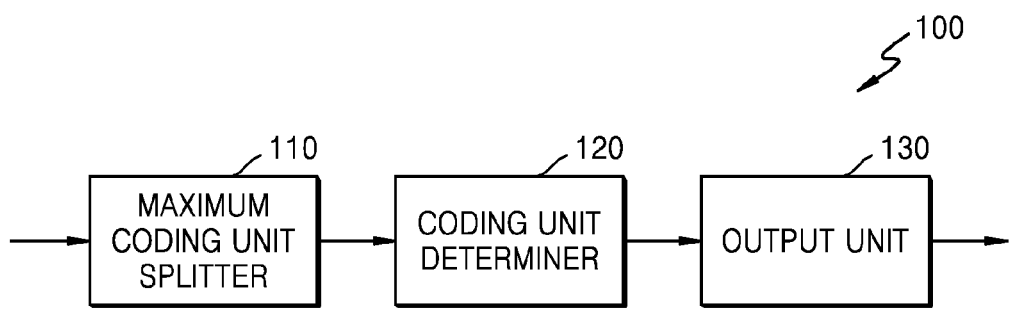
FIG. 13 is a block diagram of a video encoding apparatus based on a coding unit having a tree structure, according to an exemplary embodiment.

FIG. 13 is a block diagram of a video encoding apparatus 100 configured to encode video based on coding units having a tree structure, according to an exemplary embodiment.

The video encoding apparatus 100 configured to encode video using video prediction based on coding units having a tree structure according to an exemplary embodiment includes a maximum coding unit splitter 110, a coding unit determiner 120, and an output unit 130. Hereinafter, for convenience of description, the video encoding apparatus 100 configured to encode video using video prediction based on coding units having a tree structure, according to an exemplary embodiment, may also be referred to as 'video encoding apparatus 100.'

The maximum coding unit splitter 110 may split a current picture based on a maximum coding unit that is a coding unit having a maximum size for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, or 256×256, wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth increases, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit a total number of times a height and a width of the maximum coding unit are hierarchically split, may be previously set.

The coding unit determiner 120 encodes at least one split region obtained by splitting a region of the maximum coding unit according to depths, and determines a depth to output final encoding results according to the at least one split region. In other words, the coding unit determiner 120 determines a coded depth by encoding the image data in the deeper coding units according to depths, according to the maximum coding unit of the current picture, and selecting a depth having a least encoding error. The determined coded depth and the image data according to the maximum coding unit are output to the output unit 130.

The image data in the maximum coding unit is encoded based on the deeper coding units corresponding to at least one depth equal to or less than the maximum depth, and encoding results are compared based on each of the deeper coding units. A depth having the least encoding error may be selected after comparing encoding errors of the deeper coding units. At least one coded depth may be selected for each maximum coding unit.

A size of the maximum coding unit is split as a coding unit is hierarchically split according to depths, and a number of coding units increases. Also, even if coding units correspond to the same depth in one maximum coding unit, it is determined whether to split each of the coding units corresponding to the same depth to a lower depth by measuring an encoding error of the data of each coding unit, separately. Accordingly, even when data is included in one maximum coding unit, the encoding errors according to depths may differ according to regions, and thus the coded depths may differ according to regions. Thus, one or more coded depths may be set for one maximum coding unit, and the data of the maximum coding unit may be divided according to coding units of the one or more coded depths.

Accordingly, the coding unit determiner 120 according to an exemplary embodiment may determine coding units having a tree structure included in a current maximum coding unit. The 'coding units having a tree structure' according to an exemplary embodiment include coding units corresponding to a depth determined to be a coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of times splitting is performed from a maximum coding unit to a minimum coding unit. A first maximum depth according to an exemplary embodiment may denote a total number of times splitting is performed from the maximum coding unit to the minimum coding unit. A second maximum depth according to an exemplary embodiment may denote a total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. In this case, if the minimum coding unit is a coding unit obtained by splitting the maximum coding unit four times, 5 depth levels of depths 0, 1, 2, 3 and 4 exist, and thus the first maximum depth may be set to 4 and the second maximum depth may be set to 5.

Prediction encoding and frequency transformation may be performed according to the maximum coding unit. The prediction encoding and the transformation are also performed based on the deeper coding units according to a depth equal to or depths less than the maximum depth, according to the maximum coding unit.

Since a number of deeper coding units increases whenever the maximum coding unit is split according to depths, encoding including the prediction encoding and the frequency transformation has to be performed on all of the deeper coding units generated as the depth increases. For convenience of description, the prediction encoding and the frequency transformation will now be described based on a coding unit of a current depth, from among at least one maximum coding unit.

The video encoding apparatus 100 according to an exemplary embodiment may variously select a size or shape of a data unit for encoding the image data. In order to encode the image data, operations, such as prediction encoding, frequency transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, e.g., based on a coding unit that is no longer split into coding units corresponding to a lower depth. Hereinafter, the coding unit that is no longer split and becomes a basis unit for prediction encoding may also be referred to as a 'prediction unit'. A partition obtained by splitting the prediction unit may include a prediction unit and a data unit obtained by splitting at least one of a height and a width of the prediction unit.

For example, when a coding unit of 2N×2N (where N is a positive integer) is no longer split, the coding unit may become a prediction unit of 2N×2N and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to an exemplary embodiment may also perform the frequency transformation on the image data in a coding unit based not only on the coding unit for encoding the image data but also based on a data unit that is different from the coding unit. In order to perform the frequency transformation in the coding unit, the frequency transformation may be performed based on a transformation unit having a size smaller than or equal to the coding unit. For example, the transformation unit may include a transformation unit for an intra mode and a transformation unit for an inter mode.

Similarly to the coding unit having a tree structure, the transformation unit in the coding unit may be recursively split into smaller sized transformation units, and thus, residual data in the coding unit may be divided according to the transformation unit having a tree structure according to transformation depths.

A transformation depth indicating a number of times splitting is performed to reach the transformation unit by splitting the height and width of the coding unit may also be set in the transformation unit according to an exemplary embodiment. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information requires not only information about the coded depth but also about information related to prediction encoding and frequency transformation. Accordingly, the coding unit determiner 120 not only determines a coded depth having a least encoding error but also determines a partition type in a prediction unit, a prediction mode according to prediction units, and a size of a transformation unit for frequency transformation.

Coding units having a tree structure in a maximum coding unit, a prediction unit or partition, and a method of determining a transformation unit according to an exemplary embodiment will be described in detail later with reference to FIGS. 15 through 25.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, the encoding is performed on the current coding unit of the current depth, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit and information about at least one encoding mode is determined for a coding unit of a coded depth, information about at least one encoding mode may be determined for one maximum coding unit. Also, a coded depth of the data of the maximum coding unit may be different according to locations since the data is hierarchically split according to depths, and thus information about the coded depth and the encoding mode may be set for the data.

Accordingly, the output unit 130 according to an exemplary embodiment may assign encoding information about a corresponding coded depth and an encoding mode to at least one of the coding unit, the prediction unit, and a minimum unit included in the maximum coding unit.

The minimum unit according to an exemplary embodiment is a square-shaped data unit obtained by splitting the minimum coding unit constituting a lowermost depth by 4. Alternatively, the minimum unit may be a maximum square-shaped data unit that may be included in all of the coding units, prediction units, partition units, and transformation units included in the maximum coding unit.

For example, the encoding information output through the output unit 130 may be classified into encoding information according to deeper coding units according to depths, and encoding information according to prediction units. The encoding information according to the deeper coding units according to depths may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter, or a picture parameter set.

Also, information about a maximum size of a transformation unit and information about a minimum size of a transformation, allowed for a current video, may also be output via a header of a bitstream, a sequence parameter set or a picture parameter set.

In the video encoding apparatus 100 according to a simple example of an exemplary embodiment, the deeper coding unit is a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of 4 coding units of the lower depth.

Accordingly, the video encoding apparatus 100 according to an exemplary embodiment may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and frequency transformations, an optimum encoding mode may be determined considering image characteristics of the coding unit of various image sizes.

Thus, if an image having high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100 according to an exemplary embodiment, image compression efficiency may be increased since a coding unit is adjusted while considering characteristics of an image while increasing a maximum size of a coding unit while considering a size of the image.

Figure 14:
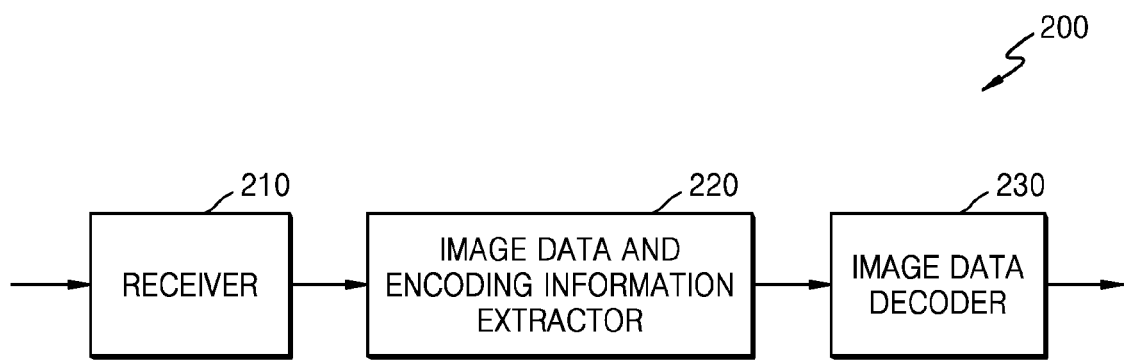
FIG. 14 is a block diagram of a video decoding apparatus based on a coding unit having a tree structure, according to an exemplary embodiment.

FIG. 14 is a block diagram of a video decoding apparatus 200 according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 may be identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having the tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coded depth, and information about an encoding mode according to each coded depth may include information about a partition type of a corresponding coding unit corresponding to the coded depth, a prediction mode, and a size of a transformation unit. Also, split information according to depths may be extracted as the information about the coded depth.

The information about the coded depth and the encoding mode according to each maximum coding unit extracted by the image data and encoding information extractor 220 is information about a coded depth and an encoding mode determined to generate a least encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to an encoding mode that generates the least encoding error.

Since encoding information about the coded depth and the encoding mode according to an exemplary embodiment may be assigned to a predetermined data unit from among a corresponding coding unit, a prediction unit, and a minimum unit, the image data and encoding information extractor 220 may extract the information about the coded depth and the encoding mode according to the predetermined data units. When the information about the coded depth of the corresponding maximum coding unit and the encoding mode is recorded according to the predetermined data units, the predetermined data units having the same information about the coded depth and the encoding mode may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse frequency transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse frequency transformation according to each transformation unit in the coding unit by reading the information about the size of the transformation unit having a tree structure according to the coding units, so as to perform the inverse frequency transformation according to maximum coding units. A pixel value of a spatial domain of a coding unit may be restored through inverse frequency transformation.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data of the current depth by using the information about the partition type of the prediction unit, the prediction mode, and the size of the transformation unit for image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. Information about an encoding mode may be obtained for each coding unit determined in this manner to decode a current coding unit.

Finally, the video decoding apparatus 200 may obtain information about a coding unit that generates the least encoding error when encoding is recursively performed for each maximum coding unit in an encoding process, and may use the information to decode the current picture. In other words, encoded image data of the coding units having the tree structure determined to be the optimum coding units in each maximum coding unit may be decoded.

Accordingly, even if image data has high resolution and a large amount of data, the image data may be efficiently decoded and restored according to a size of a coding unit and an encoding mode, which are adaptively determined according to characteristics of an image, by using information about an optimum encoding mode received from an encoder.

Figure 15:
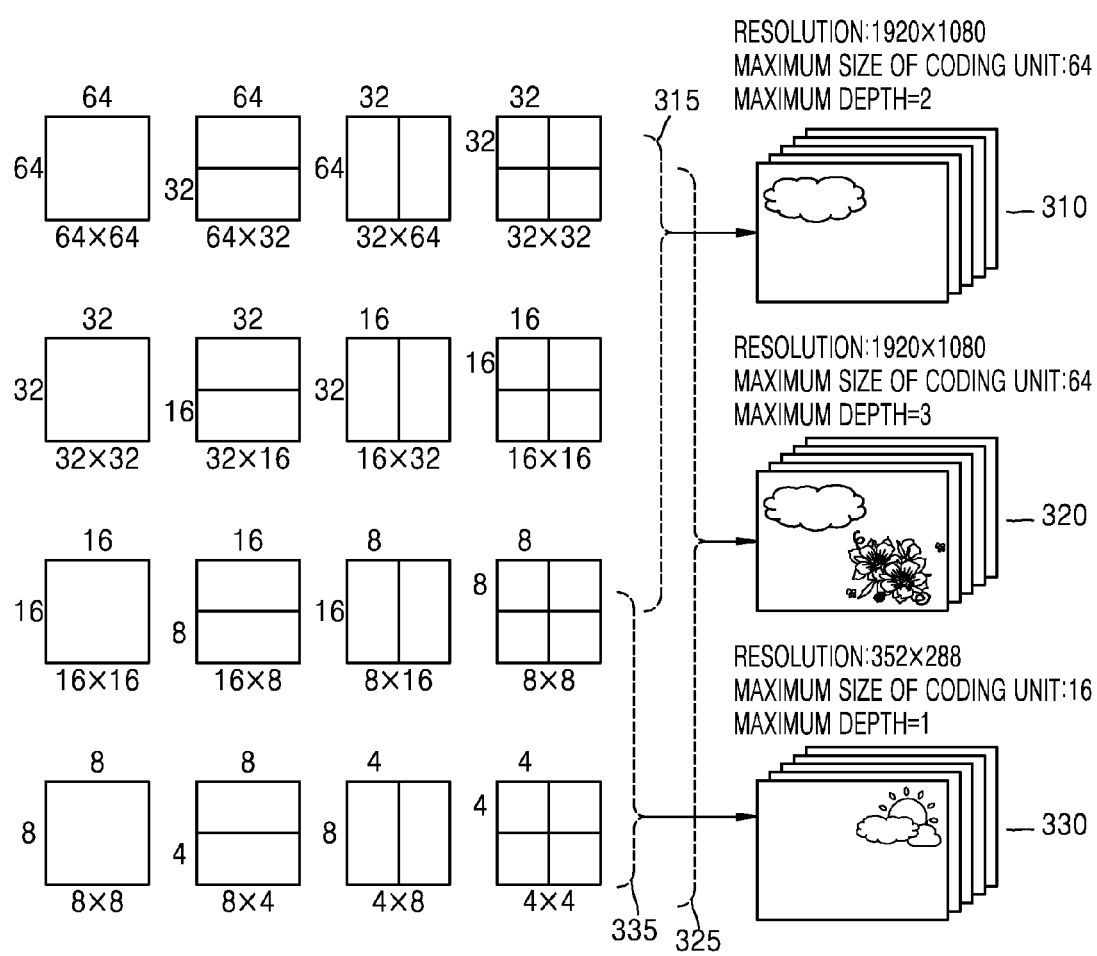
FIG. 15 is a diagram for describing a concept of coding units according to an exemplary embodiment.

FIG. 15 is a diagram for describing a concept of coding units according to an exemplary embodiment.

A size of a coding unit may be expressed in width×height, and examples of the size of the coding unit may include 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is set to 1920×1080, a maximum size of a coding unit is set to 64, and a maximum depth is set to 2. In video data 320, a resolution is set to 1920×1080, a maximum size of a coding unit is set to 64, and a maximum depth is set to 3. In video data 330, a resolution is set to 352×288, a maximum size of a coding unit is set to 16, and a maximum depth is set to 1. The maximum depth shown in FIG. 15 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are increased to two layers by splitting the maximum coding unit twice. Since the maximum depth of the video data 330 is 1, coding units 335 of the video data 330 may include a maximum coding unit having a long axis size of 16, and coding units having a long axis size of 8 since depths are increased to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are increased to 3 layers by splitting the maximum coding unit three times. As a depth increases, detailed information may be more precisely expressed.

Figure 16:
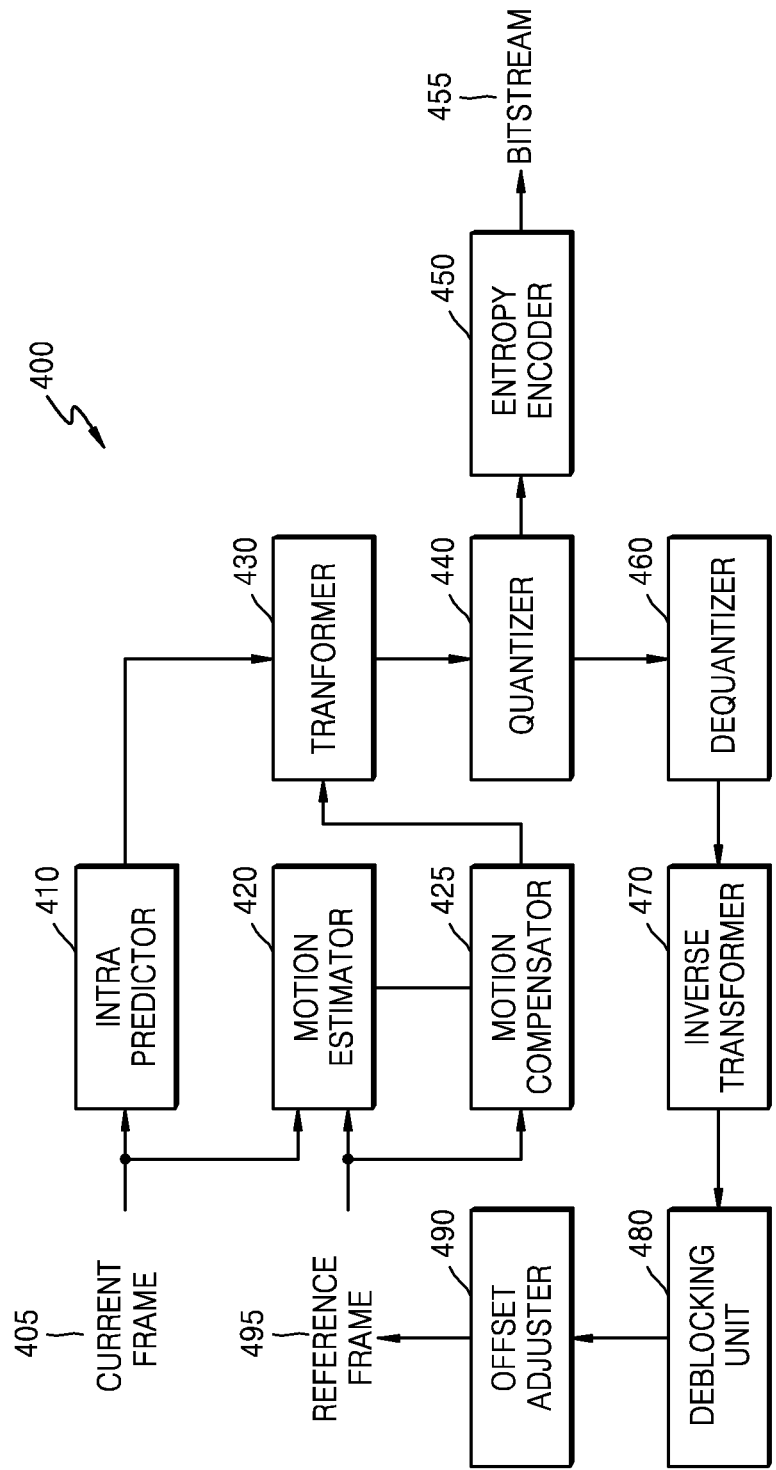
FIG. 16 is a block diagram of an image encoder configured to encode images based on coding units, according to an exemplary embodiment.

FIG. 16 is a block diagram of an image encoder configured to encode images based on coding units, according to an exemplary embodiment.

The image encoder 400 according to an exemplary embodiment performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a frequency transformer 430 and a quantizer 440. The quantized transformation coefficient is restored as data in a spatial domain through an inverse quantizer 460 and an inverse frequency transformer 470, and the restored data in the spatial domain is output as the reference frame 495 after being post-processed through a deblocking unit 480 (e.g., deblocker) and an offset adjuster 490. The quantized transformation coefficient may be output as a bitstream 455 through an entropy encoder 450.

In order for the image encoder 400 to be implemented in the video encoding apparatus 100 according to an exemplary embodiment, all elements of the image encoder 400, e.g., the intra predictor 410, the motion estimator 420, the motion compensator 425, the frequency transformer 430, the quantizer 440, the entropy encoder 450, the inverse quantizer 460, the inverse frequency transformer 470, the deblocking unit 480, and the offset adjuster 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having the tree structure while considering the maximum size and the maximum depth of a current maximum coding unit, and the frequency transformer 430 determines the size of the transformation unit in each coding unit from among the coding units having the tree structure.

Figure 17:
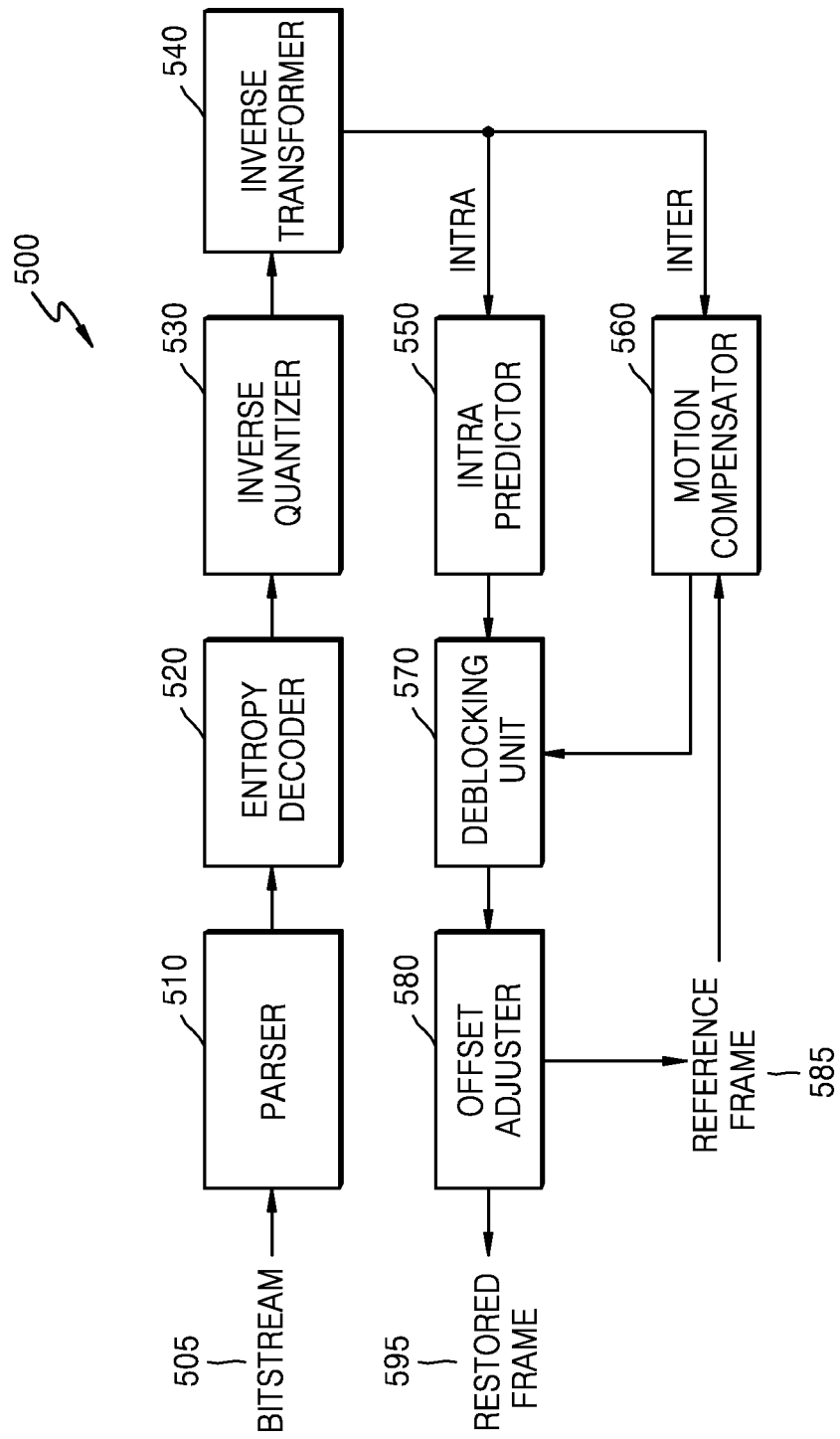
FIG. 17 is a block diagram of an image decoder configured to decode video based on coding units, according to an exemplary embodiment.

FIG. 17 is a block diagram of an image decoder configured to decode images based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse frequency transformer 540.

An intra predictor 550 performs intra prediction on coding units in an intra mode with respect to the image data in the spatial domain, and a motion compensator 560 performs motion compensation on coding units in an inter mode by using a reference frame 585.

The data in the spatial domain, which passed through the intra predictor 550 and the motion compensator 560, may be output as a restored frame 595 after being post-processed through a deblocking unit (e.g., deblocker) 570 and an offset adjuster 580. Also, the data, which is post-processed through the deblocking unit 570 and the offset adjusting unit 580, may be output as the reference frame 585.

In order to decode the image data in the image data decoder 230 of the video decoding apparatus 200, the image decoder 500 may perform operations that are performed after operations of the parser 510 are performed.

In order for the image decoder 500 to be implemented in the video decoding apparatus 200 according to an exemplary embodiment, all elements of the image decoder 500, e.g., the parser 510, the entropy decoder 520, the inverse quantizer 530, the inverse frequency transformer 540, the intra predictor 550, the motion compensator 560, the deblocking unit 570, and the offset adjuster 580 perform operations based on coding units having a tree structure for each maximum coding unit.

Specifically, the intra predictor 550 and the motion compensator 560 determine partitions and a prediction mode for each of the coding units having the tree structure, and the inverse frequency transformer 540 determines a size of a transformation unit for each coding unit.

Figure 18:
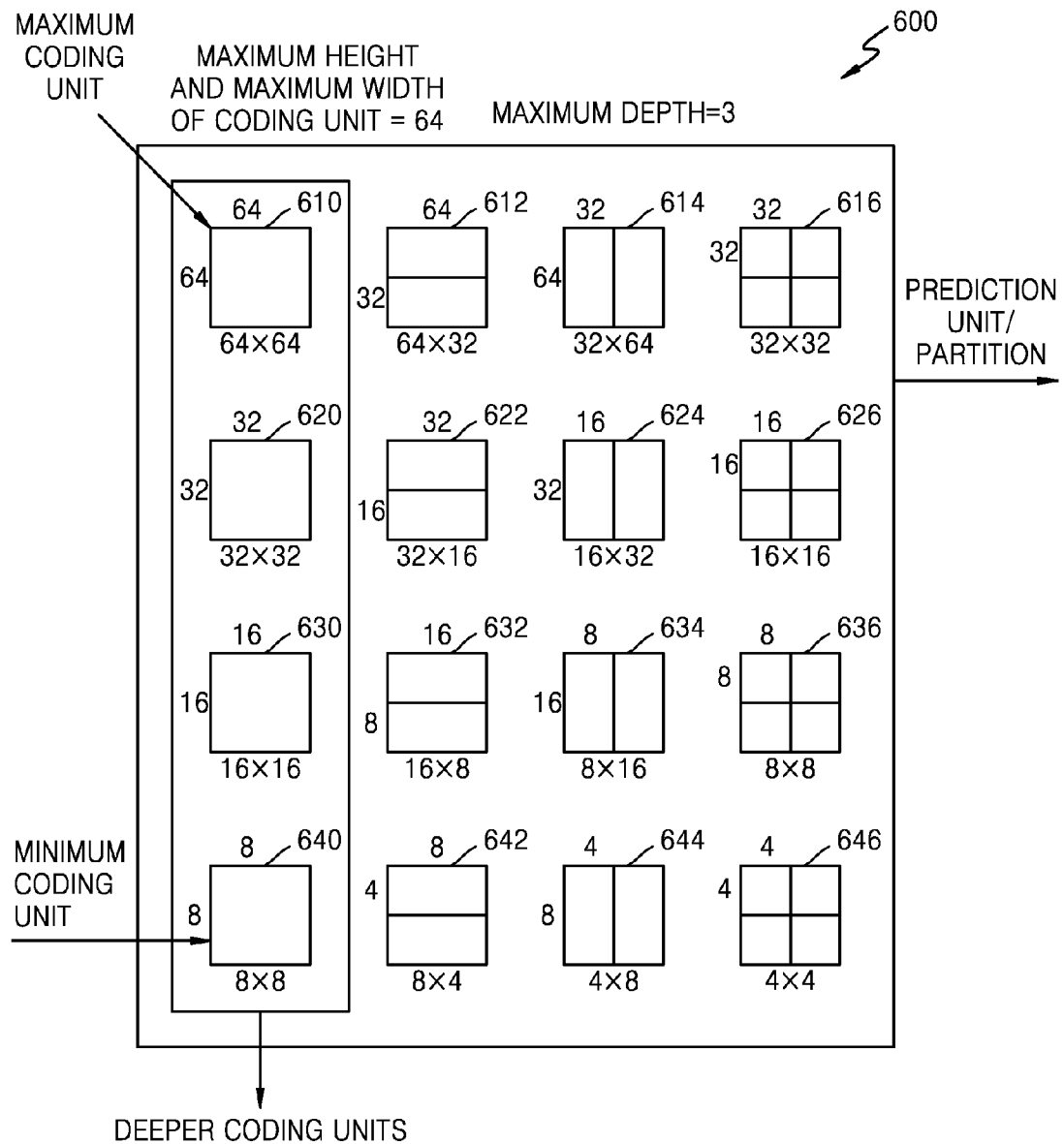
FIG. 18 is a diagram illustrating deeper coding units according to depths and prediction units, according to an exemplary embodiment.

FIG. 18 is a diagram illustrating deeper coding units according to depths and partitions, according to an exemplary embodiment.

The video encoding apparatus 100 according to an exemplary embodiment and the video decoding apparatus 200 according to an exemplary embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the maximum size of the coding unit which is previously set.

In a hierarchical structure 600 of coding units according to an exemplary embodiment, the maximum height and the maximum width of the coding units are each 64, and the maximum depth is 3. Since a depth increases along a vertical axis of the hierarchical structure 600 of the coding units according to an exemplary embodiment, a height and a width of the deeper coding unit are each split. Also, a prediction unit and partitions, which are bases for prediction encoding of each deeper coding unit, are shown along a horizontal axis of the hierarchical structure 600 of the coding units.

In other words, a coding unit 610 is a maximum coding unit in the hierarchical structure 600 of the coding units, wherein a depth is 0 and a size, e.g., a height by width, is 64×64. The depth increases along the vertical axis, and a coding unit 620 having a size of 32×32 and a depth of 1, a coding unit 630 having a size of 16×16 and a depth of 2, and a coding unit 640 having a size of 8×8 and a depth of 3 are provided. The coding unit 640 having a size of 8×8 and a depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e.e.g., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, e.g., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, e.g., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, e.g., a partition having a size of 8×8 included in the coding unit 640, partitions 642 having a size of 8×4, partitions 644 having a size of 4×8, and partitions 646 having a size of 4×4.

Finally, the coding unit 640 having the size of 8×8 and the depth of 3 is the minimum coding unit and a coding unit of a lowermost depth.

In order to determine a coded depth of the maximum coding unit 610, the coding unit determiner 120 of the video encoding apparatus 100 according to an exemplary embodiment has to perform encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 have to be each encoded.

In order to perform encoding according to each depth, a representative encoding error that is a least encoding error in the corresponding depth may be selected by performing encoding for each prediction unit in the deeper coding units, along the horizontal axis of the hierarchical structure 600 of the coding units. Alternatively, the least encoding error may be searched for by comparing representative encoding errors according to depths by performing encoding for each depth as the depth increases along the vertical axis of the hierarchical structure 600 of the coding units. A depth and a partition having the least encoding error in the maximum coding unit 610 may be selected as the coded depth and a partition type of the maximum coding unit 610.

FIG. 19 is a diagram for describing a relationship between a coding unit and transformation units, according to an exemplary embodiment.

The video encoding apparatus 100 according to an exemplary embodiment or the video decoding apparatus 200 according to an exemplary embodiment encodes or decodes an image according to coding units having sizes smaller than or equal to a maximum coding unit for each maximum coding unit. Sizes of transformation units for frequency transformation during encoding may be selected based on data units that are not larger than a corresponding coding unit.

For example, in the video encoding apparatus 100 according to an exemplary embodiment or the video decoding apparatus 200 according to an exemplary embodiment, if a size of the current coding unit 710 is 64×64, frequency transformation may be performed by using the transformation units 720 having a size of 32×32.

Also, data of the coding unit 710 having the size of 64×64 may be encoded by performing the frequency transformation on each of the transformation units having the size of 32×32, 16×16, 8×8, and 4×4, which are smaller than 64×64, and then a transformation unit having a least error with respect to the original may be selected.

FIG. 20 is a diagram for describing encoding information of coding units corresponding to a coded depth, according to an exemplary embodiment.

The output unit 130 of the video encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 about the partition type indicates a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type of the current coding unit is set to indicate one of the partition 804 having a size of 2N×N, the partition 806 having a size of N×2N, and the partition 808 having a size of N×N The information 810 about the prediction mode indicates a prediction mode of each partition. For example, the information 810 about the prediction mode may indicate a mode of prediction encoding performed on a partition indicated by the information 800, e.g., an intra mode 812, an inter mode 814, or a skip mode 816.

Also, the information 820 about the size of the transformation unit indicates a transformation unit to be based on when frequency transformation is performed on a current coding unit. For example, the transformation unit may be a first intra transformation unit 822, a second intra transformation unit 824, a first inter transformation unit 826, or a second intra transformation unit 828.

Figure 21:
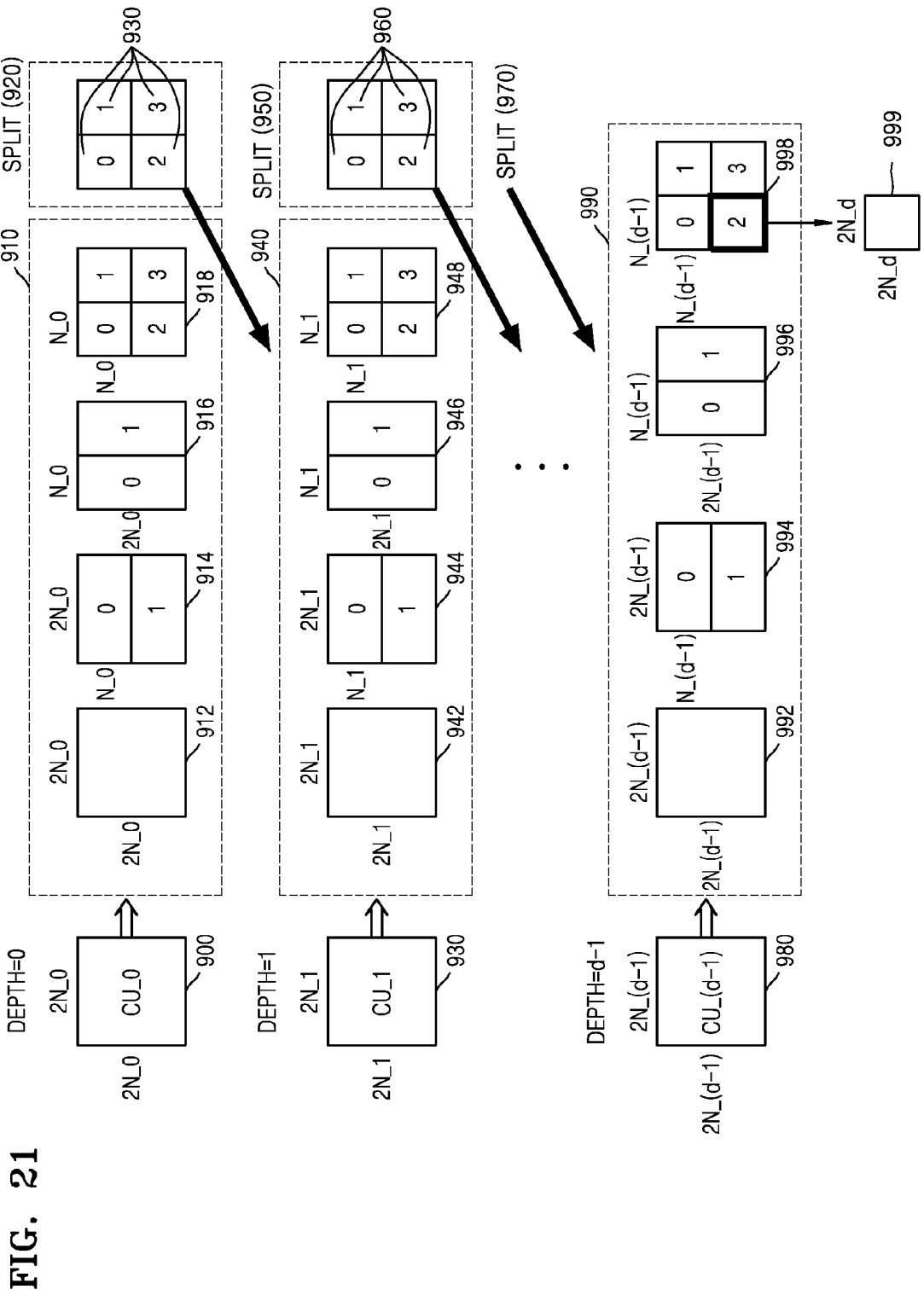
FIG. 21 is a diagram of deeper coding units according to depths according to an exemplary embodiment.

The image data and encoding information extractor 220 of the video decoding apparatus 200 according to an exemplary embodiment may extract and use the information 800 about the partition type, the information 810 about the prediction mode, and the information 820 about the size of the transformation unit for decoding according to each deeper coding unit FIG. 21 is a diagram of deeper coding units according to depths according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 19 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may be no longer split to a lower depth.

If the encoding error is the smallest in the partition type 918 having the size of N_0×N_0, a depth may be changed from 0 to 1 to split the partition type 918 in operation 920, and encoding may be repeatedly performed on coding units 930 having a depth of 2 and a size of N_0×N_0 to search for a least encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth may be changed from 1 to 2 to split the partition type 948 in operation 950, and encoding may be repeatedly performed on coding units 960, which have a depth of 2 and a size of N_2×N_2 to search for a least encoding error.

When a maximum depth is d, split information according to each depth may be set until a depth becomes d−1, and split information may be set until a depth becomes d−2. In other words, when encoding is performed until the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the partition types 992 through 998 to search for a partition type having a least encoding error.

When the partition type 998 having the size of N_(d−1)×N_(d−1) has the least encoding error, since a maximum depth is d, a coding unit CU_(d−1) having a depth of d−1 may be no longer split to a lower depth, a coded depth for a current maximum coding unit 900 may be determined to be d−1, and a partition type of the current maximum coding unit 900 may be determined to be N_(d−1)×N_(d−1). Also, since the maximum depth is d, split information for a coding unit 952 having a depth of d−1 is not set.

A data unit 999 may be referred to as a 'minimum unit' for the current maximum coding unit. A minimum unit according to an exemplary embodiment may be a rectangular data unit obtained by splitting a minimum coding unit having a lowermost coded depth by 4. By performing the encoding repeatedly, the video encoding apparatus 100 may select a depth having a least encoding error by comparing encoding errors according to depths of the coding unit 900 to determine a coded depth, and may set a corresponding partition type and a prediction mode as an encoding mode of the coded depth.

As such, the least encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit has to be split from a depth of 0 to the coded depth, only split information of the coded depth has to be set to 0, and split information of depths excluding the coded depth has to be set to 1.

The image data and encoding information extractor 220 of the video decoding apparatus 200 according to an exemplary embodiment may extract and use the information about the coded depth and the prediction unit of the coding unit 900 to decode the coding unit 912. The video decoding apparatus 200 according to an exemplary embodiment may determine a depth, in which split information is 0, as a coded depth by using split information according to depths, and may use information about an encoding mode of the corresponding depth for decoding.

Figure 22:
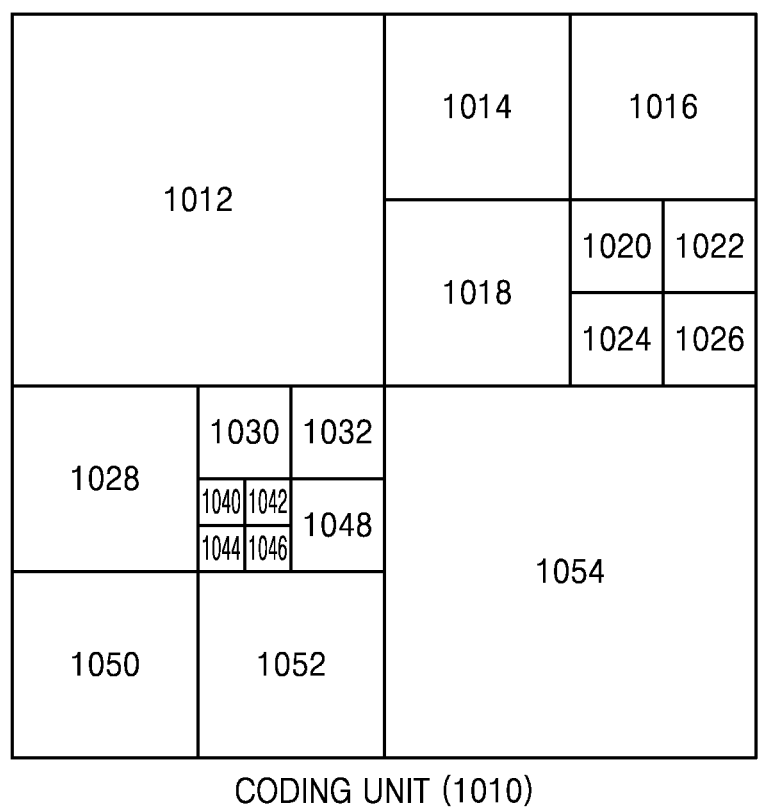
FIGS. 22, 23, and 24 are diagrams for describing a relationship between coding units, prediction units, and frequency transformation units, according to an exemplary embodiment.
Figure 23:
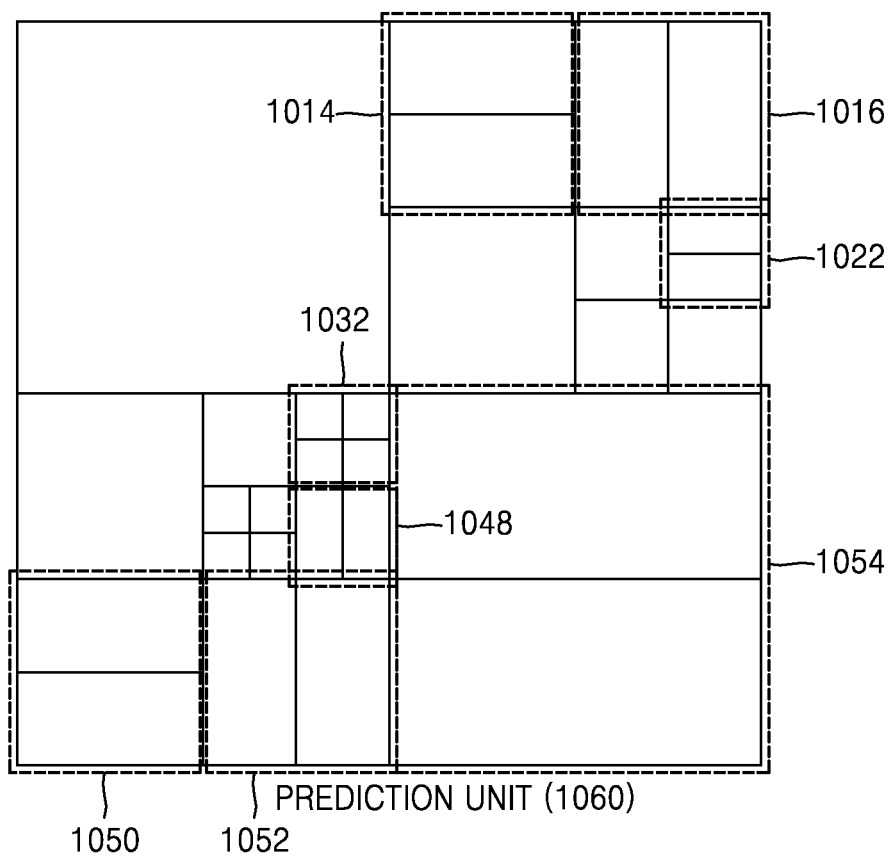
Figure 24:
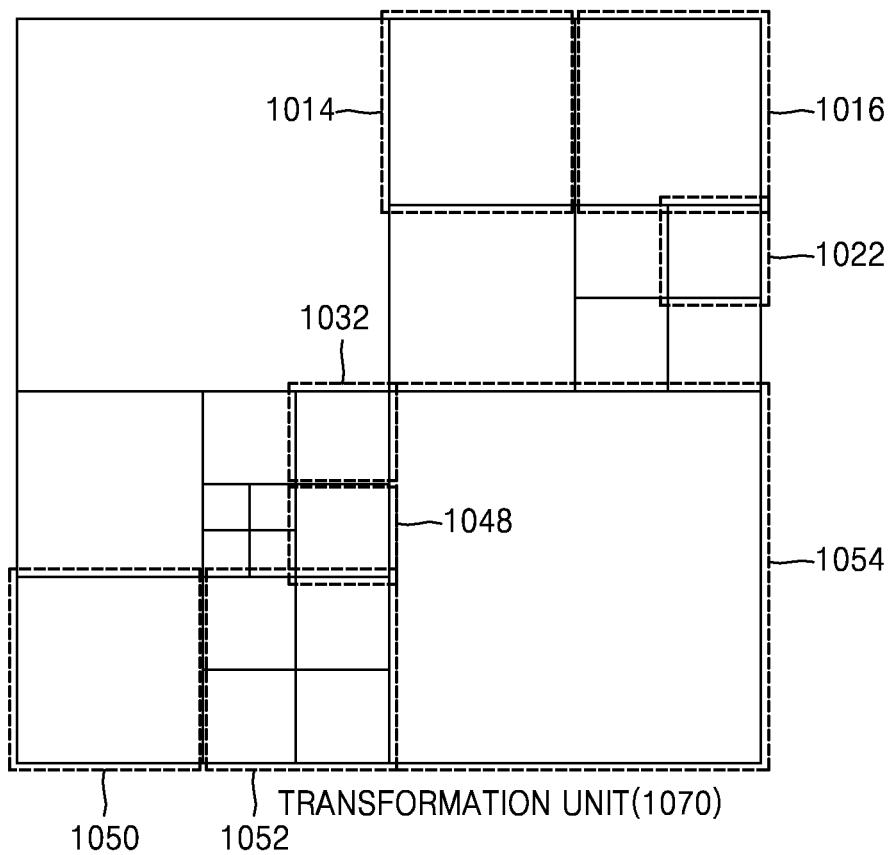

FIGS. 22, 23, and 24 are diagrams for describing a relationship between coding units, prediction units, and frequency transformation units, according to an exemplary embodiment.

The coding units 1010 are coding units corresponding to coded depths determined by the video encoding apparatus 100 according to an exemplary embodiment, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units. In other words, partition types in the partitions 1014, 1022, 1050, and 1054 have a size of 2N×N, partition types in the partitions 1016, 1048, and 1052 have a size of N×2N, and a partition type of the partition 1032 has a size of N×N. Prediction units and partitions of the coding units 1010 are smaller than or equal to each coding unit.

Frequency transformation or inverse frequency transformation is performed on image data of the transformation unit 1052 in the transformation units 1070 in a data unit that is smaller than the transformation unit 1052. Also, the transformation units 1014, 1016, 1022, 1032, 1048, 1050, and 1052 in the transformation units 1070 are different from those in the prediction units 1060 in terms of sizes or shapes. In other words, the video encoding apparatus 100 according to an exemplary embodiment and the video decoding apparatus 200 according to an exemplary embodiment may perform intra prediction, motion estimation, or motion compensation, and frequency transformation or inverse frequency transformation individually on a data unit even in the same coding unit.

Accordingly, encoding may be recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 2 shows the encoding information that may be set by the video encoding apparatus 100 according to an exemplary embodiment and the video decoding apparatus 200 according to an exemplary embodiment.

may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD are respectively obtained by splitting the height of the prediction unit in 1:3 and 3:1, and the asymmetrical partition types having the sizes of nL×2N and nR×2N are respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit is set to 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be set to N×N, and if the partition type of the current coding unit is an asymmetrical partition type, the size of the transformation unit may be set to N/2×N/2.

The encoding information about coding units having a tree structure according to an exemplary embodiment may be assigned to at least one of a coding unit corresponding to

TABLE 2

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | |

The output unit 130 of the video encoding apparatus 100 according to an exemplary embodiment may output the encoding information about the coding units having the tree structure, and the image data and encoding information extractor 220 of the video decoding apparatus 200 according to an exemplary embodiment may extract the encoding information about the coding units having the tree structure from a received bitstream.

Split information indicates whether a current coding unit is split into coding units of a lower depth. If split information of a current depth d is 0, a depth, in which a current coding unit is no longer split to a lower depth, is a coded depth, and thus information about a partition type, a prediction mode, and a size of a transformation unit may be defined for the coded depth. If the current coding unit is further split according to the split information, encoding has to be independently performed on four split coding units of a lower depth.

A prediction mode may be one of an intra mode, an inter mode, and a skip mode. The intra mode and the inter mode a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth may be determined by using encoding information of a data unit, and thus a distribution of coded depths in a maximum coding unit may be determined.

Accordingly, if a current coding unit is predicted by referring to adjacent data units, encoding information of data units in deeper coding units adjacent to the current coding unit may be directly referred to and used.

Alternatively, if a current coding unit is prediction encoded by referring to adjacent data units, data units adjacent to the current coding unit in deeper coding units may be searched for by using encoded information of the data units, and the searched adjacent coding units may be referred to for prediction encoding the current coding unit.

Figure 25:
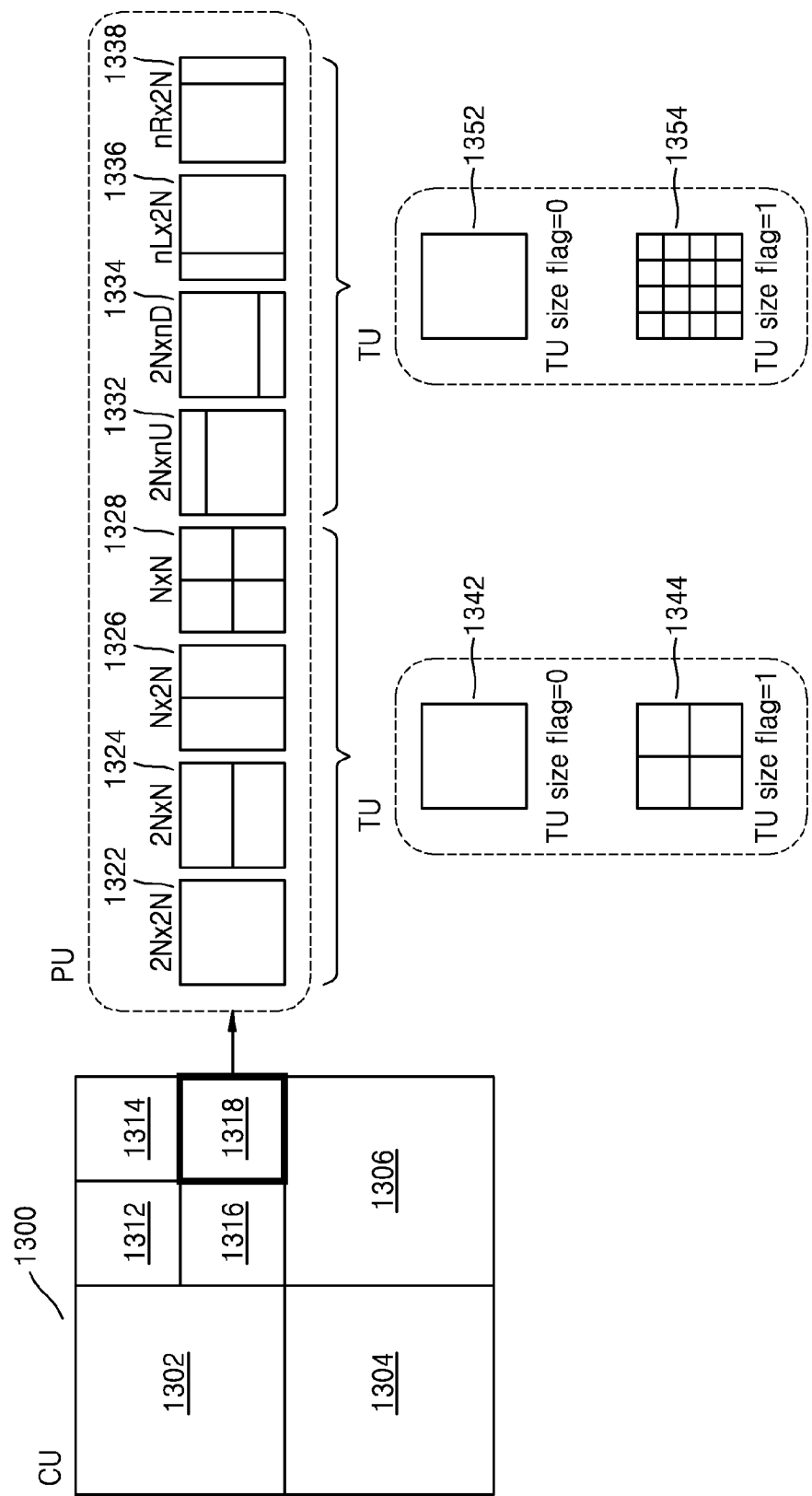
FIG. 25 is a diagram for describing a relationship between a coding unit, a prediction unit, and a transformation unit according to encoding mode information of Table 2.

FIG. 25 is a diagram for describing a relationship between a coding unit, a prediction unit, and a transformation unit, according to the encoding mode information of Table 2.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Transformation unit split information (TU size flag) is a type of a transformation index, and a size of a transformation unit corresponding to a transformation index may be modified according to a prediction unit type or a partition type of a coding unit.

For example, when the partition type is set to be symmetrical, e.g., the partition type 1322 having the size of 2N×2N, 1324 having the size of 2N×N, 1326 having the size of N×2N, or 1328 having the size of N×N, a transformation unit 1342 having a size of 2N×2N may be set if split information (TU size flag) of a transformation unit is 0, and a transformation unit 1344 having a size of N×N may be set if a TU size flag is 1.

When the partition type is set to be asymmetrical, e.g., the partition type 1332 having the size of 2N×nU, 1334 having the size of 2N×nD, 1336 having the size of nL×2N, or 1338 having the size of nR×2N, a transformation unit 1352 having a size of 2N×2N may be set if a TU size flag is 0, and a transformation unit 1354 having a size of N/2×N/2 may be set if a TU size flag is 1.

The TU size flag described above with reference to FIG. 25 is a flag having a value or 0 or 1, but the TU size flag is not limited to a 1 bit flag, and a transformation unit may be hierarchically split while the TU size flag increases from 0 according to a set up. The TU size flag may be used as an example of a transformation index.

In this case, the size of a transformation unit that has been actually used may be expressed by using a TU size flag of a transformation unit, together with a maximum size and minimum size of the transformation unit. The video encoding apparatus 100 according to an exemplary embodiment is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 according to an exemplary embodiment may decode video by using the maximum transformation unit size information, the minimum transformation unit size information, and the maximum TU size flag.

For example, (a) if the size of a current coding unit is 64×64 and a maximum transformation unit size is 32×32, then the size of a transformation unit may be 32×32 when a TU size flag is 0 (a-1), may be 16×16 when the TU size flag is 1 (a-2), and may be 8×8 when the TU size flag is 2 (a-3).

As another example, (b) if the size of the current coding unit is 32×32 and a minimum transformation unit size is 32×32, then the size of the transformation unit may be 32×32 when the TU size flag is 0 (b-1). Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad \text{Equation (1)}$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

The maximum transformation unit size RootTuSize according to an exemplary embodiment may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad \text{Equation (2)}$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad \text{Equation (3)}$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the exemplary embodiments are not limited thereto.

A maximum coding unit including coding units having a tree structure described above with reference to FIGS. 13 through 25 is also referred to in various other ways, such as a coding block tree, a block tree, a root block tree, a coding tree, a coding root, or a tree trunk.

The exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the exemplary embodiments have been particularly shown and described with reference to certain exemplary embodiments thereof, it will be understood by those skilled in the art that various changes in form and details may be made therein without departing from the spirit and scope of the exemplary embodiments as defined by the appended claims. Therefore, the scope of the exemplary embodiments is defined not by the detailed description of the exemplary embodiments but by the appended claims, and all differences within the scope will be construed as being included in the exemplary embodiments.

The invention claimed is:

1. A multilayer video encoding method comprising:
   encoding a multilayer video;
   generating network abstraction layer (NAL) units for data units included in the encoded multilayer video; and
   adding scalable extension type information, for a scalable extension of the multilayer video, to a video parameter set (VPS) NAL unit among the NAL units, the VPS NAL unit comprising VPS information that is information applied to the multilayer video; and
   outputting an encoded scalable video bitstream including the encoded multilayer video and the generated NAL units with added scalable extension type information;
   wherein the adding of the scalable extension type information comprises adding, to a header of the VPS NAL unit: 1) a scalable extension type table index indicating a scalable extension type table among scalable extension type tables including combinations of scalable extension types that are applicable to the multilayer video; and 2) a plurality of sub-layer indexes indicating specific scalable extension types included in a combination among the combinations of the scalable extension types included in the scalable extension type table indicated by the scalable extension type table index.

2. The multilayer video encoding method of claim 1, wherein the generating of the NAL units comprises:
   generating a slice segment NAL unit including encoded information in units of slices for slice units included in the multilayer video;
   generating a picture parameter set (PPS) NAL unit including information about a PPS that is applied to pictures included in the multilayer video;
   generating a sequence parameter set (SPS) NAL unit including information about an SPS that is applied to an image sequence of a predetermined layer included in the multilayer video; and
   generating the VPS NAL unit including information about the VPS that is applied to the multilayer video which is a set of image sequences of the predetermined layer.

3. The multilayer video encoding method of claim 2, wherein the PPS NAL unit further includes another layer index indicating a combination among the combinations of the scalable extension types included in the scalable extension type table indicated by the scalable extension type table index in order to indicate a scalable extension type applied to the PPS NAL unit.

4. The multilayer video encoding method of claim 2, wherein the SPS NAL unit further includes another layer index indicating a combination among the combinations of the scalable extension types included in the scalable extension type table indicated by the scalable extension type table index in order to indicate a scalable extension type applied to the SPS NAL unit.

5. The multilayer video encoding method of claim 1, wherein the scalable extension type information comprises at least one of temporal scalability, qualitative scalability, spatial scalability, and view information.

6. The multilayer video encoding method of claim 1, wherein the scalable extension type information is the scalable extension type table index indicating the scalable extension type table among the scalable extension type tables including the combinations of scalable extension types that are applicable to the multilayer video,
   wherein the scalable extension type table is included in a supplemental enhancement information (SEI) message to be transmitted.

7. A multilayer video encoding apparatus comprising:
   a processor, and
   a memory storing a program which causes the processor to:
   encode a multilayer video; and
   generate network abstraction layer (NAL) units for data units included in the encoded multilayer video,
   add scalable extension type information, for scalable extension of the multilayer video, to a video parameter set (VPS) NAL unit among the NAL units, the VPS NAL unit including VPS information that is information applied to the multilayer video; and
   output an encoded scalable video bitstream including the encoded multilayer video and the generated NAL units with added scalable extension type information;
   wherein the processor is configured to add the scalable extension type information by adding, to a header of the VPS NAL unit: 1) a scalable extension type table index indicating a scalable extension type table among scalable extension type tables including combinations of scalable extension types that are applicable to the multilayer video; and 2) a plurality of sub-layer indexes indicating specific scalable extension types included in a combination among the combinations of the scalable extension types included in the scalable extension type table indicated by the scalable extension type table index.

8. A multilayer video decoding method comprising:
   receiving network abstraction layer (NAL) units that are generated by dividing an encoded multilayer video according to data units;
   obtaining a video parameter set (VPS) NAL unit from among the received NAL units, the VPS NAL unit including VPS information that is information applied to the multilayer video; and
   obtaining scalable extension type information for scalable extension of the multilayer video from the VPS NAL unit; and
   decoding the encoded multilayer video according to the scalable type information; and
   outputting the decoded multilayer video;
   wherein the obtaining of the scalable extension type information comprises obtaining, from a header of the VPS NAL unit; 1) a scalable extension type table index indicating a scalable extension type table among scalable extension type tables including combinations of scalable extension types that are applicable to the multilayer video; and 2) a plurality of sub-layer indexes indicating specific scalable extension types included in a combination among the combinations of the scalable extension types included in the scalable extension type table indicated by the scalable extension type table index.

9. The multilayer video decoding method of claim 8, wherein the NAL units comprise, for slice units included in the multilayer video, a slice segment NAL unit including encoded information of a slice unit, a picture parameter set (PPS) NAL unit including information about PPS information that is applied to pictures included in the multilayer video, a sequence parameter set (SPS) NAL unit including information about SPS information that is applied to an image sequence of a predetermined layer included in the multilayer video, and the VPS NAL unit,
  wherein the slice segment NAL unit, the PPS NAL unit, the SPS NAL unit, and the VPS NAL unit are identified based on a NAL unit identifier included in a header of the NAL unit.

10. The multilayer video decoding method of claim 8, wherein the obtaining of the scalable extension type information further comprises:
  obtaining another layer index indicating a combination among the combinations of the scalable extension types included in the scalable extension type table indicated by the scalable extension type table index from a PPS NAL unit including information about a PPS that is applied to pictures included in the multilayer video, and determining a scalable extension type applied to the pictures by using the obtained layer index.

11. The multilayer video decoding method of claim 8, wherein the obtaining of the scalable extension type information further comprises:
  obtaining another layer index indicating a combination among the combinations of the scalable extension types included in the scalable extension type table indicated by the scalable extension type table index from a SPS NAL unit including information about an SPS that is applied to image sequences of a predetermined layer included in the multilayer video, and determining a scalable extension type applied to the image sequence of the predetermined layer by using the obtained layer index.

12. The multilayer video decoding method of claim 8, wherein the scalable extension type information comprises the scalable extension type table indicating the scalable extension type table among the scalable extension type tables including the combinations of scalable extension types that are applicable to the multilayer video,
  wherein the scalable extension type table is included in a supplemental enhancement information (SEI) message to be received.

13. A multilayer video decoding apparatus comprising:
  a processor, and
  a memory storing a program which causes the processor to:
  receive network abstraction layer (NAL) units that are generated by dividing a multilayer video according to data units;
  obtain a video parameter set (VPS) NAL unit among the NAL units, the VPS NAL unit including VPS information that is information applied to the multilayer video;
  obtain from the VPS NAL unit scalable extension type information for scalable extension of the multilayer video;
  decode the encoded multilayer video according to the scalable type information; and
  output the decoded multilayer video;
  wherein the processor is configured to obtain the scalable extension type information by obtaining, from a header of the VPS NAL unit: 1) a scalable extension type table index indicating a scalable extension type table among scalable extension type tables including combinations of scalable extension types that are applicable to the multilayer video; and 2) a plurality of sub-layer indexes indicating specific scalable extension types included in a combination among the combinations of the scalable extension types included in the scalable extension type table indicated by the scalable extension type table index.

* * * * *